United States Patent
Narita et al.

(10) Patent No.: US 11,344,952 B2
(45) Date of Patent: May 31, 2022

(54) THREE-DIMENSIONAL ADDITIVE MANUFACTURING DEVICE, THREE-DIMENSIONAL ADDITIVE MANUFACTURING METHOD, AND THREE-DIMENSIONAL ADDITIVE MANUFACTURED PRODUCT

(71) Applicant: MITSUBISHI HEAVY INDUSTRIES, LTD., Tokyo (JP)

(72) Inventors: Ryuichi Narita, Tokyo (JP); Toshiya Watanabe, Tokyo (JP); Akio Kondou, Tokyo (JP); Hidetaka Haraguchi, Tokyo (JP); Shuji Tanigawa, Tokyo (JP); Masashi Kitamura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 244 days.

(21) Appl. No.: 16/613,565

(22) PCT Filed: Aug. 8, 2017

(86) PCT No.: PCT/JP2017/028845
§ 371 (c)(1),
(2) Date: Nov. 14, 2019

(87) PCT Pub. No.: WO2019/030839
PCT Pub. Date: Feb. 14, 2019

(65) Prior Publication Data
US 2021/0162505 A1 Jun. 3, 2021

(51) Int. Cl.
B22F 10/85 (2021.01)
B22F 10/38 (2021.01)
(Continued)

(52) U.S. Cl.
CPC ............. *B22F 10/85* (2021.01); *B22F 10/28* (2021.01); *B22F 10/368* (2021.01); *B22F 10/38* (2021.01);
(Continued)

(58) Field of Classification Search
CPC .......... B22F 10/85; B22F 10/38; B22F 10/28; B22F 10/368; B22F 3/105; B22F 3/16;
(Continued)

(56) References Cited

U.S. PATENT DOCUMENTS 10,118,345 B2 * 11/2018 Dimatteo ........... G05B 19/4097
2002/0019683 A1   2/2002 White et al.
(Continued)

FOREIGN PATENT DOCUMENTS

CN 204366412 6/2015
CN 104959603 10/2015
(Continued)

OTHER PUBLICATIONS

International Search Report dated Oct. 31, 2017 in International (PCT) Application No. PCT/JP2017/028845 with English-language translation.
(Continued)

*Primary Examiner* — Michael J Brown
(74) *Attorney, Agent, or Firm* — Wenderoth, Lind & Ponack, L.L.P.

(57) ABSTRACT

A three-dimensional additive manufacturing device is configured to emit a beam to a powder bed formed by laying a powder on a base plate to harden the powder bed selectively. A sensor is configured to detect the shape or the temperature of a surface of the powder bed or a modeling surface. A defect in laying of the powder or a defect in emission of the beam is corrected based on the detection result, before completion of forming of the next layer.

19 Claims, 17 Drawing Sheets

(51) Int. Cl.
*B22F 10/28* (2021.01)
*B22F 10/368* (2021.01)
*G01B 11/25* (2006.01)
*G01N 21/95* (2006.01)
*B22F 3/16* (2006.01)
*B33Y 10/00* (2015.01)
*B33Y 30/00* (2015.01)
*B33Y 50/02* (2015.01)

(52) U.S. Cl.
CPC .............. *G01B 11/25* (2013.01); *G01N 21/95* (2013.01); *B33Y 10/00* (2014.12); *B33Y 30/00* (2014.12); *B33Y 50/02* (2014.12)

(58) Field of Classification Search
CPC ........ G01B 11/25; G01N 21/95; B33Y 10/00; B33Y 30/00; B33Y 50/02; Y02P 10/25; B29C 64/393; B29C 64/153
USPC ......................................................... 700/119
See application file for complete search history.

(56) References Cited

U.S. PATENT DOCUMENTS

| | | | |
|---|---|---|---|
| 2002/0041818 A1 | 4/2002 | Abe et al. | |
| 2004/0026807 A1 | 2/2004 | Andersson et al. | |
| 2009/0206522 A1 | 8/2009 | Hein et al. | |
| 2015/0183158 A1 | 7/2015 | Schwarze et al. | |
| 2015/0321422 A1* | 11/2015 | Boyer | G01J 5/004 |
| | | | 264/497 |
| 2016/0224017 A1 | 8/2016 | Huang et al. | |
| 2016/0339519 A1 | 11/2016 | Sargent | |
| 2017/0144248 A1 | 5/2017 | Yoshimura et al. | |
| 2017/0274599 A1 | 9/2017 | Kitamura et al. | |
| 2018/0297115 A1* | 10/2018 | Diwinsky | B33Y 50/02 |

FOREIGN PATENT DOCUMENTS

| | | |
|---|---|---|
| JP | 1-162584 | 6/1989 |
| JP | 2002-115004 | 4/2002 |
| JP | 2003-531034 | 10/2003 |
| JP | 3491627 | 1/2004 |
| JP | 2004-122490 | 4/2004 |
| JP | 2005-97692 | 4/2005 |
| JP | 2009-1900 | 1/2009 |
| JP | 2010-509092 | 3/2010 |
| JP | 2015-120342 | 7/2015 |
| JP | 2015-196265 | 11/2015 |
| WO | 2016/042810 | 3/2016 |
| WO | 2016/081651 | 5/2016 |

OTHER PUBLICATIONS

International Preliminary Report On Patentability dated Feb. 20, 2020 in International (PCT) Application No. PCT/JP2017/028845 with English-language translation.
Office Action dated Apr. 20, 2021 in corresponding CN Application No. 201780090892.0.
Notice of Reasons for Refusal dated Jul. 14, 2020 in corresponding Japanese Patent Application No. 2019-535489, with Machine Translation.

\* cited by examiner

THREE-DIMENSIONAL ADDITIVE MANUFACTURING DEVICE, THREE-DIMENSIONAL ADDITIVE MANUFACTURING METHOD, AND THREE-DIMENSIONAL ADDITIVE MANUFACTURED PRODUCT

TECHNICAL FIELD

The present disclosure relates to a three-dimensional additive manufacturing device manufacturing a three-dimensional shaped product by performing additive manufacturing by emitting a beam such as a light beam or an electronic beam to a laid powder, a three-dimensional additive manufacturing method performed by the three-dimensional additive manufacturing device, and a three-dimensional additive manufactured product which can be manufactured by the three-dimensional additive manufacturing method.

BACKGROUND

A three-dimensional additive manufacturing technique for manufacturing a three-dimensional shaped product by performing additive manufacturing by emitting a beam such as a light beam or an electronic beam to powders laid in layers is known. JP 2009-1900 A discloses an example of the technique of this type, and describes that the three-dimensional shaped product is manufactured by forming a sintered layer by emitting the light beam to a powder layer formed with the powders, and integrally stacking a plurality of sintered layers by repeatedly forming the sintered layers.

SUMMARY

Technical Problem

A three-dimensional additive manufacturing method as described in JP 2009-1900 A forms a large three-dimensional shaped product by repeatedly stacking the sintered layers, and thus requires a long work time until completion of the product. The fact is that the work time reaches several tens of hours if a metal powder of, for example, iron, copper, aluminum, or titanium is used, in particular.

Moreover, the three-dimensional additive manufacturing method of this type conventionally does not include a technique of inspecting a modeling defect while a modeling work advances, and thus a quality evaluation is made by performing a defective inspection after completion of a series of modeling works. Accordingly, a three-dimensional shaped product has to be discarded as a defective product, if an abnormality such as the modeling defect is found in an inspection after the modeling works, wasting the long work time spent by then. The above problems impedes an improvement of productivity in the three-dimensional additive manufacturing method.

At least one embodiment of the present invention was made in view of the above, and an object of the present invention is to provide a three-dimensional additive manufacturing device capable of detecting, at an early stage, various abnormalities generated during the modeling works, avoiding a modeling failure by performing a correction work in real time, and achieving good production efficiency, a three-dimensional additive manufacturing method performed by the three-dimensional additive manufacturing device, and a three-dimensional additive manufactured product which can be manufactured by the three-dimensional additive manufacturing method.

Solution to Problem (1) In order to solve the above problems, a three-dimensional additive manufacturing device according to at least one embodiment of the present invention includes a base plate, a powder-laying unit for laying a powder onto the base plate to form a powder bed, a beam emitting unit for emitting a beam to the powder bed so as to harden the powder bed selectively, and at least one sensor for measuring a roughness on the powder bed, a roughness or a temperature on a modeling surface formed by emitting the beam to the powder bed, or a temperature of the powder bed during emission of the beam. The three-dimensional additive manufacturing device is configured to correct a defect in laying of the powder already performed by the powder-laying unit or a defect in emission of the beam already performed by the beam emitting unit, on the basis of a detection result of the at least one sensor, before completion of forming of a next layer.

With the above configuration (1), i) the roughness on the powder bed, ii) the roughness or the temperature on the modeling surface formed by emitting the beam to the powder bed, or iii) the temperature of the powder bed during emission of the beam is monitored by measurement using the sensor. As a result, if the sensor obtains a measurement result to be an abnormality or a sign thereof, the defect in laying of the powder already performed by the powder-laying unit or the defect in emission of the beam already performed by the beam emitting unit is corrected before completion of forming of the next layer. Thus, it is possible to detect various abnormalities occurred during a modeling work at an early stage and to avoid a modeling failure by performing a correction work in real time.

(2) In some embodiments, in the above configuration (1), the at least one sensor includes a first shape measurement sensor for detecting the roughness on the powder bed, and the powder-laying unit is configured to lay again the powder so as to reduce the roughness of the powder bed before emission of the beam to the powder bed, if a magnitude of the roughness detected by the first shape measurement sensor is out of an allowable range.

With the above configuration (2), the first shape measurement sensor monitors the roughness on the powder bed to be an abnormality or a sign thereof. Then, the powder-laying unit lays again the powder so as to reduce the roughness before emission of the beam to the powder bed, if the first shape measurement sensor detects the roughness having the magnitude out of the allowable range. Thus, it is possible to prevent, at an early stage, the roughness from becoming a fatal abnormality as the modeling work advances.

(3) In some embodiments, in the above configuration (2), the three-dimensional additive manufacturing device further includes a component-replacement warning part configured to output a warning to urge replacement of a component of the powder-laying unit, if the magnitude of the roughness detected by the first shape measurement sensor is out of the allowable range after the powder is laid again by the powder-laying unit.

With the above configuration (3), if the roughness on the powder bed is not improved even by laying again the powder, a mechanical defect in the powder-laying unit may be considered, and thus the warning to urge component replacement is made. Thus, it is possible to avoid a situation where a fruitless time is spent on the modeling work while having a defect which cannot be overcome in terms of control.

(4) In some embodiments, in any one of the above configurations (1) to (3), the at least one sensor includes a second shape measurement sensor for detecting the roughness on the modeling surface, the three-dimensional additive manufacturing device further includes a powder-supplying unit for supplying the powder selectively to a concave portion detected by the second shape measurement sensor, and the beam emitting unit is configured to emit the beam to the powder supplied to the concave portion by the powder-supplying unit.

With the above configuration (4), the second shape measurement sensor monitors the roughness on the modeling surface indicating an abnormality or a sign thereof. As a result, if the concave portion is detected on the modeling surface, the powder-supplying unit selectively (locally) supplies a powder to the concave portion to fill the concave portion, and the beam is emitted to the supplied powder to be hardened. The concave portion is thus dissolved in real time during the modeling work, making it possible to prevent, at an early stage, the concave portion from becoming a fatal abnormality as the modeling work advances.

(5) In some embodiments, in any one of the above configurations (1) to (4), the at least one sensor includes a second shape measurement sensor for detecting the roughness on the modeling surface, and the beam emitting unit is configured to emit the beam to a convex portion detected by the second shape measurement sensor.

With the above configuration (5), the second shape measurement sensor monitors the roughness on the modeling surface indicating an abnormality or a sign thereof. As a result, if the convex portion is detected on the modeling surface, the beam is emitted to the convex portion to be melted, thereby eliminating the convex portion. The convex portion is thus dissolved in real time during the modeling work, making it possible to prevent, at an early stage, the convex portion from becoming a fatal abnormality as the modeling work advances.

(6) In some embodiments, in any one of the above configurations (1) to (5), the at least one sensor includes a second shape measurement sensor for detecting the roughness on the modeling surface, and the three-dimensional additive manufacturing device further includes a convex-portion removing unit for removing a convex portion detected by the second shape measurement sensor.

With the above configuration (6), the second shape measurement sensor monitors the roughness on the modeling surface indicating an abnormality or a sign thereof. As a result, if the convex portion is detected on the modeling surface, the convex portion is mechanically removed by the convex-portion removing unit. By thus mechanically removing the convex portion, it is possible to avoid a situation where a constituent of the convex portion has a negative effect on quality of a body of a three-dimensional shaped product by integrating the convex portion in the body as in a case in which the convex portion is removed by melting.

(7) In some embodiments, in the above configuration (6), the convex-portion removing unit includes a cutter or an air blow torch for removing the convex portion.

With the above configuration (7), the convex portion on the modeling surface may mechanically be removed by the cutter or the air blow torch.

(8) In some embodiments, in the above configuration (6) or (7), the three-dimensional additive manufacturing device further includes a controller for controlling at least the beam emitting unit and the convex-portion removing unit, and the controller is configured to determine whether the convex portion is a spatter formed during emission of the beam, on the basis of a shape of the convex portion detected by the second shape measurement sensor, control the convex-portion removing unit to remove the spatter if the convex portion is the spatter, and control the beam emitting unit to emit the beam to the convex portion if the convex portion is not the spatter.

With the above configuration (8), it is determined whether the convex portion on the modeling surface is the spatter, and the two different removing methods are used on the basis of the determination result. The spatter is formed containing the relatively high percentage of an oxide when the powder is melted by the beam. Thus, it is possible to reliably separate the convex portion while avoiding integration of the convex portion in the body of the three-dimensional shaped product by mechanically removing the convex portion with the convex-portion removing unit, if the controller determines that the convex portion is the spatter. On the other hand, there is no such a concern if the convex portion is not the spatter, and thus it is possible to quickly remove the convex portion by emitting the beam to the convex portion.

(9) In some embodiments, in the above configuration (8), the controller determines that the convex portion is the spatter, if a projected area of the convex portion is not more than 300 μm×300 μm.

With the above configuration (9), the controller determines that the convex portion on the modeling surface is the spatter, if the projected area of the convex portion is not more than 300 μm×300 μm, which corresponds to a particle size of a typical spatter. Spatters are formed various ways. For example, in a case in which a spatter is formed by scattering from a molten pool formed by emitting the beam to the powder bed to be solidified, the spatter is expected to have a relatively large particle size of about 150 μm to 300 μm. Thus, it is possible to determine that the convex portion is the spatter of this type depending on whether the projected area of the convex portion falls within the range.

(10) In order to solve the above problems, a three-dimensional additive manufacturing method according to at least one embodiment of the present invention is a three-dimensional additive manufacturing method which performs modeling by emitting a beam to a powder bed formed by laying a powder on a base plate to selectively harden the powder bed, the method including a measuring step of measuring a roughness on the powder bed, a roughness or a temperature on a modeling surface formed by emitting the beam to the powder bed, or a temperature of the powder bed during emission of the beam, and a correcting step of correcting a defect in laying of the powder in the powder bed already formed or a defect in emission of the beam already performed by the beam emitting unit, on the basis of a measurement result in the measuring step, before completion of forming of a next layer.

The above method (10) can suitably be performed by the three-dimensional additive manufacturing device according to the above configuration (1).

(11) In some embodiments, in the above method (10), the measuring step includes measuring the roughness on the powder bed, and the correcting step includes laying again the powder so as to reduce the roughness of the powder bed before emitting the beam to the powder bed, if a magnitude of the roughness measured in the measuring step is out of an allowable range.

The above method (11) can suitably be performed by the three-dimensional additive manufacturing device according to the above configuration (2).

(12) In some embodiments, in the above method (10) or (11), the measuring step includes measuring the roughness on the modeling surface, and the correcting step includes supplying the powder selectively to a concave portion measured in the measuring step, and emitting the beam to the powder supplied to the concave portion.

The above method (12) can suitably be performed by the three-dimensional additive manufacturing device according to the above configuration (4).

(13) In some embodiments, in any one of the above methods (10) to (12), the measuring step includes measuring the roughness on the modeling surface, and the correcting step includes emitting the beam to a convex portion measured in the measuring step.

The above method (13) can suitably be performed by the three-dimensional additive manufacturing device according to the above configuration (5).

(14) In some embodiments, in any one of the above methods (10) to (13), the measuring step includes measuring the roughness on the modeling surface, and the correcting step includes removing a convex portion measured in the measuring step.

The above method (14) can suitably be performed by the three-dimensional additive manufacturing device according to the above configuration (6).

(15) In some embodiments, in the above method (14), the correcting step includes removing the convex portion by using a cutter or an air blow torch.

The above method (15) can suitably be performed by the three-dimensional additive manufacturing device according to the above configuration (7).

(16) In some embodiments, in the above method (14) or (15), the correcting step includes determining whether the convex portion is a spatter formed during emission of the beam, on the basis of a shape of the convex portion measured in the measuring step, removing the spatter if the convex portion is the spatter, and emitting the beam to the convex portion if the convex portion is not the spatter.

The above method (16) can suitably be performed by the three-dimensional additive manufacturing device according to the above configuration (8).

(17) In order to solve the above problems, a three-dimensional additive manufactured product according to at least one embodiment of the present invention is a three-dimensional additive manufactured product manufactured by performing additive manufacturing by emitting a beam to powders laid in layers, the three-dimensional additive manufactured product being manufactured by forming a powder bed by laying the powders on a base plate, selectively hardening the powder bed by emitting the beam to the powder bed, measuring a roughness on the powder bed, a roughness or a temperature on a modeling surface formed by emitting the beam to the powder bed, or a temperature of the powder bed during emission of the beam, and correcting a defect in laying of the powders in the powder bed already formed or a defect in emission of the beam already performed, on the basis of a measurement result, before completion of forming of a next layer.

Since the defect in laying of the powders or the defect in emission of the beam is corrected before completion of forming of the next layer, the three-dimensional additive manufactured product of the above (17) has superior quality.

Advantageous Effects

According to at least one embodiment of the present invention, it is possible to provide a three-dimensional additive manufacturing device capable of detecting, at an early stage, various abnormalities generated during modeling works, avoiding a modeling failure by performing a correction work in real time, and achieving good production efficiency and a three-dimensional additive manufacturing method performed by the three-dimensional additive manufacturing device.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
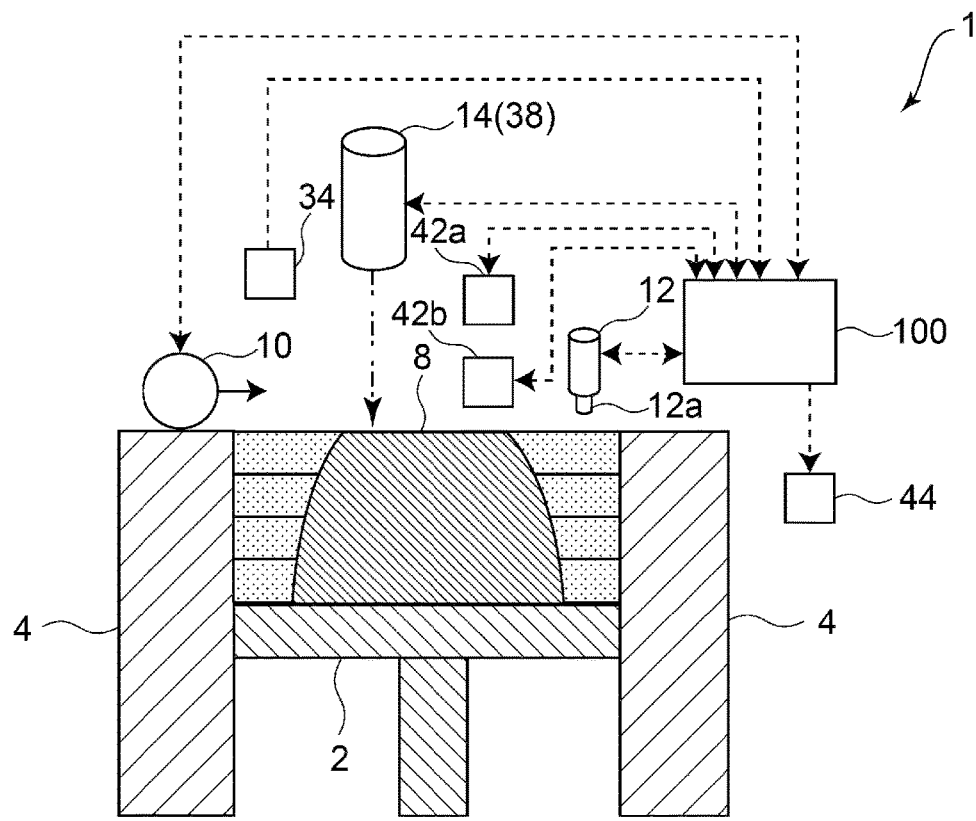
FIG. 1 is a schematic view of the entire configuration of a three-dimensional additive manufacturing device according to at least one embodiment of the present invention.

FIG. 1 is a schematic view of the entire configuration of a three-dimensional additive manufacturing device 1 according to at least one embodiment of the present invention.

The three-dimensional additive manufacturing device 1 is a device for manufacturing a three-dimensional shaped product by performing additive manufacturing by emitting a beam to powders laid in layers. The three-dimensional additive manufacturing device 1 includes a base plate 2 serving as a base where the three-dimensional shaped product is modeled. The base plate 2 is arranged to be lifted/lowered inside a cylinder 4 of a substantially cylindrical shape having the center axis in the vertical direction. On the base plate 2, a powder bed 8 is formed by laying a powder as will be described later. The powder bed 8 is newly formed by laying the powder on an upper-layer side every time the base plate 2 is lowered in each cycle during a modeling work.

In the three-dimensional additive manufacturing device 1 of the present embodiment, a case is shown in which a light beam is emitted as a beam. However, an idea of the present invention is similarly applicable to a case in which another type of beam such as an electronic beam is used.

The three-dimensional additive manufacturing device 1 includes a powder-laying unit 10 for laying a powder onto the base plate 2 to form the powder bed 8. The powder-laying unit 10 forms the layered powder bed 8 having a substantially uniform thickness over the entire upper surface of the base plate 2 by supplying the powder to the upper-surface side of the base plate 2 and flattening the surface of the base plate 2. The powder bed 8 formed in each cycle is selectively hardened by emitting a beam from a beam emitting unit 14 to be described later and is stacked in layers by forming a new powder bed by laying again a powder on the upper-layer side by the powder-laying unit 10 in a next cycle.

The three-dimensional additive manufacturing device 1 also includes a powder-supplying unit 12 for locally supplying the powder to a partial region on the base plate 2. The powder-supplying unit 12 includes a discharge nozzle 12a for discharging a powder. The discharge nozzle 12a is installed toward the base plate 2 and is configured to be able to locally supply the powder locally to a certain position of the powder bed 8 on the base plate 2 by being moved in the horizontal direction (on the surface of the base plate 2) by a drive mechanism (not shown).

The powders supplied from the powder-laying unit 10 and the powder-supplying unit 12 are each a powdered material to be a basic ingredient of the three-dimensional shaped product. It is possible to widely adopt, for example, a metal material such as iron, copper, aluminum, or titanium, or a non-metal material such as ceramic. In addition, the powders handled by the powder-laying unit 10 and the powder-supplying unit 12 may be the same or may be different from each other as usage.

Figure 2:
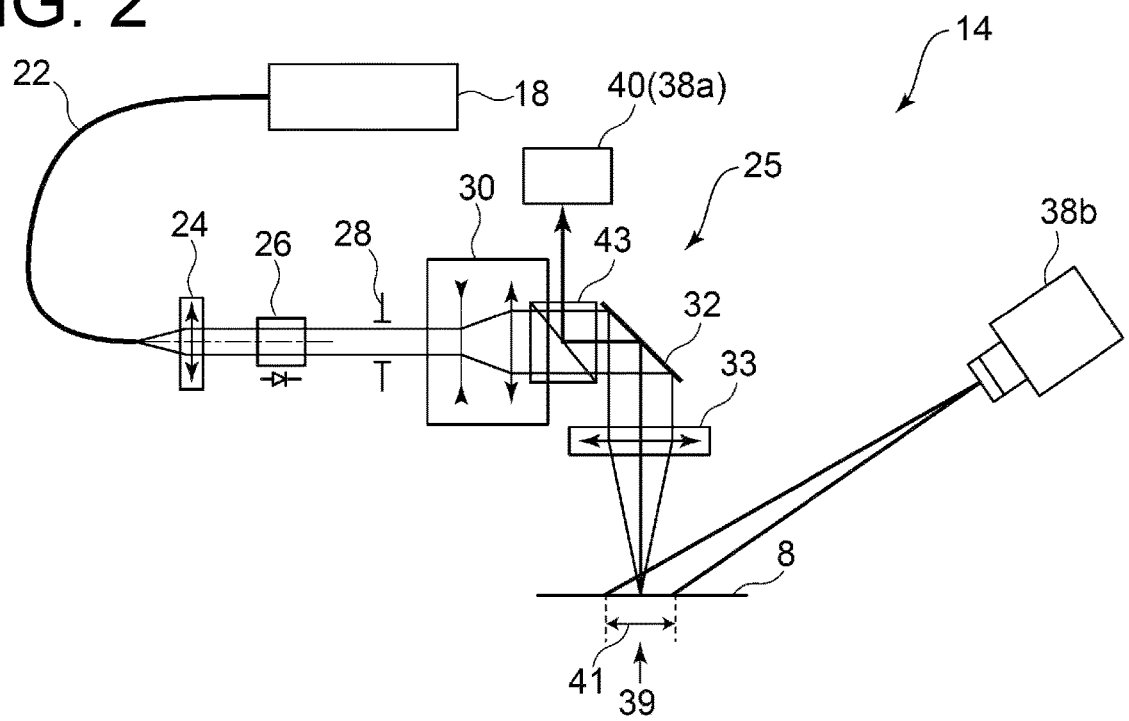
FIG. 2 is a schematic view of the internal configuration of a beam emitting unit in FIG. 1.

The three-dimensional additive manufacturing device 1 includes the beam emitting unit 14 for emitting a beam to the powder bed 8 so as to harden the powder bed 8 selectively. FIG. 2 is a schematic view of the internal configuration of the beam emitting unit 14 in FIG. 1. The beam emitting unit 14 includes a light source 18 outputting laser light as a beam, an optical fiber 22 for guiding the beam from the light source 18 to a condensing part 25, and the condensing part 25 made of a plurality of optical members.

In the condensing part 25, the beam guided by the optical fiber 22 enters a collimator 24. The collimator 24 converges the beam to parallel light. The light output from the collimator 24 enters a beam expander 30 via an isolator 26 and a pinhole 28. After the beam expander 30 expands the diameter of the beam, the beam is deflected by a galvano mirror 32 which is swingable in an arbitrary direction and is emitted to the powder bed 8 via an fθ lens 33.

The beam emitted from the beam emitting unit 14 is two-dimensionally scanned on the powder bed 8 along the surface thereof. Such 2D scanning of the beam is performed with a pattern corresponding to a three-dimensional shaped product to be modeled and may be performed by, for example, moving the beam emitting unit 14 along the surface of the base plate 2 by the drive mechanism (not shown), by drive controlling the angle of the galvano mirror 32, or by combining of these.

In the three-dimensional additive manufacturing device 1 having such a configuration, in each cycle, the powder-laying unit 10 lays the powder onto the base plate 2 to form the powder bed 8, and 2D scanning is performed on the powder bed 8 while emitting the beam from the beam emitting unit 14, thereby selectively hardening the powder contained in the powder bed 8. In the modeling work, such a cycle is repeatedly performed to stack hardened molding layers, manufacturing a target three-dimensional shaped product.

Figure 3:
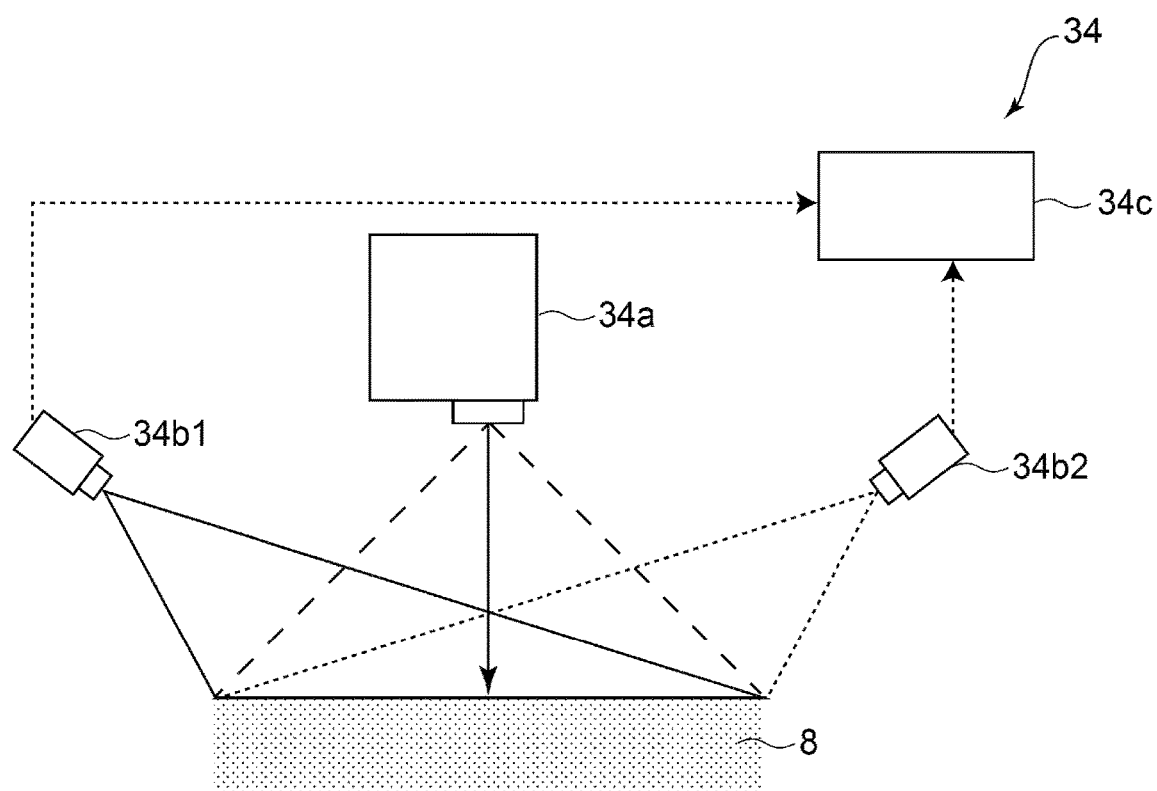
FIG. 3 is a schematic view showing a specific configuration example of a shape measurement sensor in FIG. 1.

Referring back to FIG. 1, the three-dimensional additive manufacturing device 1 includes a shape measurement sensor 34 for monitoring a shape on the powder bed 8 or a modeling surface (a surface where the beam is emitted) during the modeling work. In the present embodiment, as an example of the shape measurement sensor 34, an optical scanner based on a fringe projection method is used. FIG. 3 is a schematic view showing a specific configuration example of the shape measurement sensor 34 in FIG. 1. The shape measurement sensor 34 includes a projector 34a, at least one image capturing device (in the present embodiment, two image capturing devices 34b1 and 34b2 as an example), and an analysis part 34c. The projector 34a projects various fringe patterns on a target object (the powder bed 8 or the modeling surface). The two image capturing devices 34b1 and 34b2 are provided to obtain a pattern image projected on the target object. The analysis part 34c analyzes the shape on the powder bed 8 or the modeling surface by analyzing the image obtained by the image capturing devices 34b1 and 34b2. In the analysis part 34c, a 2D image obtained by the image capturing devices 34b1 and 34b2 is converted into an independent a three-dimensional coordinate system for each pixel on the basis of an optical conversion expression, calculating the shape on the powder bed 8 or the modeling surface.

Regarding the fringe projection method performed by the shape measurement sensor 34, a known example is followed, and thus the detailed description thereof will be omitted here. Moreover, although the analysis part 34*c* is constituted by, for example, an electronic computation device such as a computer, the analysis part 34*c* may be included in a control device 100 to be described later.

In the present embodiment, a case is exemplified in which the common shape measurement sensor 34 is configured to be able to monitor both the powder bed 8 and the modeling surface. However, shape measurement sensors having different configurations (that is, a first shape measurement sensor and a second shape measurement sensor) may be configured to be able to monitor the powder bed 8 and the modeling surface, respectively.

The three-dimensional additive manufacturing device 1 also includes a temperature measurement sensor 38 for monitoring a temperature of the powder bed 8 and the modeling surface. In the present embodiment, the three-dimensional additive manufacturing device includes, as temperature measurement sensor 38, a first temperature measurement sensor 38*a* and a second temperature measurement sensor 38*b*. The first temperature measurement sensor 38*a* is provided to measure a local temperature in an irradiated portion 39 with a beam of the powder bed 8 and the modeling surface. The second temperature measurement sensor 38*b* is provided to measure a temperature distribution in a secondary region including the irradiated portion 39 of the powder bed 8 and the modeling surface (a region wider than at least the irradiated portion).

The first temperature measurement sensor 38*a* is formed integrally with the beam emitting unit 14. More specifically, as shown in FIG. 3, the first temperature measurement sensor 38*a* is a radiation thermometer configured to measure a local temperature of the irradiated portion 39 with the beam on the basis of the intensity of an electromagnetic wave guided from the irradiated portion 39 through the optical axis of a beam (reflected light of a beam emitted to the powder bed 8), and the first temperature measurement sensor 38*a* includes a pyrometer 40. The pyrometer 40 senses thermal radiation with respect to a part of the reflected light and measures a local temperature on the basis of the Stefan-Boltzmann law. The reflected light is extracted by a dichroic mirror 43 arranged between the beam expander 30 and the galvano mirror 32 of the condensing part 25. A measurement result of the first temperature measurement sensor 38*a* is sent, as an electric signal, to the control device 100 to be described later and is used for various processes.

As described above, since the first temperature measurement sensor 38*a* measures the local temperature on the basis of the reflected light of the beam guided from the irradiated portion 39 which undergoes pinpoint beam emission, it is possible to accurately measure the local temperature. In addition, since the first temperature measurement sensor 38*a* is formed integrally with the beam emitting unit 14, and measures the temperature on the basis of a reflected wave propagating the same path as the beam emitted to the powder bed 8, it is possible to obtain good following performance with respect to a fast scanned beam.

As shown in FIG. 2, the second temperature measurement sensor 38*b* is a sensor detecting a temperature distribution in a detection target area 41 which is wider than the irradiated portion 39 of a region measured by the first temperature measurement sensor 38*a* described above. The detection target area 41 is an area having a larger area than at least the irradiated portion 39 where the beam is emitted. The second temperature measurement sensor 38*b* is configured to be able to detect a 2D temperature distribution in the area.

The above-described second temperature measurement sensor 38*b* is constituted by, for example, a two-color thermometer (pyrocamera) or an infrared camera measuring the detection target area 41 and is installed on, for example, a ceiling or a wall surface of a modeling area so as to face the detection target area 41 on the powder bed 8. In addition, the second temperature measurement sensor 38*b* may be driven such that the detection target area 41 moves so as to follow a 2D scanned beam. For example, the second temperature measurement sensor 38*b* may be following controlled such that the irradiated portion 39 is always positioned at the center of the detection target area 41. Then, similarly to the first temperature measurement sensor 38*a* described above, a measurement result of the second temperature measurement sensor 38*b* is sent, as an electric signal, to the control device 100 to be described later and is used for various processes.

Referring back to FIG. 1, the three-dimensional additive manufacturing device 1 includes a convex-portion removing unit 42 for mechanically removing a convex portion which exists on the modeling surface formed by emitting the beam to the powder bed 8. In the present embodiment, the three-dimensional additive manufacturing device 1 includes, as the convex-portion removing unit 42, a cutter removing part 42*a* and an air blow removing part 42*b* each being provided to remove the convex portion. The cutter removing part 42*a* is configured to be able to mechanically cut the convex portion existing on the surface of the modeling surface by parallelly sliding a blade surface thereof with respect to the modeling surface. On the other hand, the air blow removing part 42*b* is configured to be able to mechanically remove the convex portion by blowing high-pressure oxygen to blow away a molten metal while generating an electric arc by energizing the convex portion with an air blow torch made of a carbon rod or the like.

The three-dimensional additive manufacturing device 1 also includes a warning part 44 for making an operator and an external device aware of anomalous occurrence. In a case in which a human being such as the operator is set as an awareness target, the warning part 44 is constituted by, for example, a buzzer or an indicator for informing the human being of the anomalous occurrence in a mode to be recognized through the five physical senses such as eyesight and hearing. On the other hand, in a case in which the external device is set as the awareness target, the warning part 44 is configured to transmit an electric signal to be recognized by the external device. A predetermined corresponding operation may automatically be performed when the external device receives the electric signal.

The control device 100 is a control unit of the three-dimensional additive manufacturing device 1 and is constituted by, for example, an electronic computation device such as a computer. The control device 100 typically includes an input device capable of inputting various kinds of information, a storage device capable of storing the various kinds of information, a computing device capable of computing the various kinds of information, and an output device capable of outputting the various kinds of information. However, regarding the general configuration of the electronic computation device, a known example is followed, and thus the detailed description thereof will be omitted here. The above-described control device 100 is configured to perform the three-dimensional additive manufacturing method according to at least one embodiment of the present invention by operating in accordance with a program stored in the storage device in advance. In the following description, the internal configuration of the control device 100 is shown as functional blocks corresponding to the respective embodiments, and specific contents of the three-dimensional additive manufacturing method performed by respective configurations will be described.

First Embodiment

Figure 4:
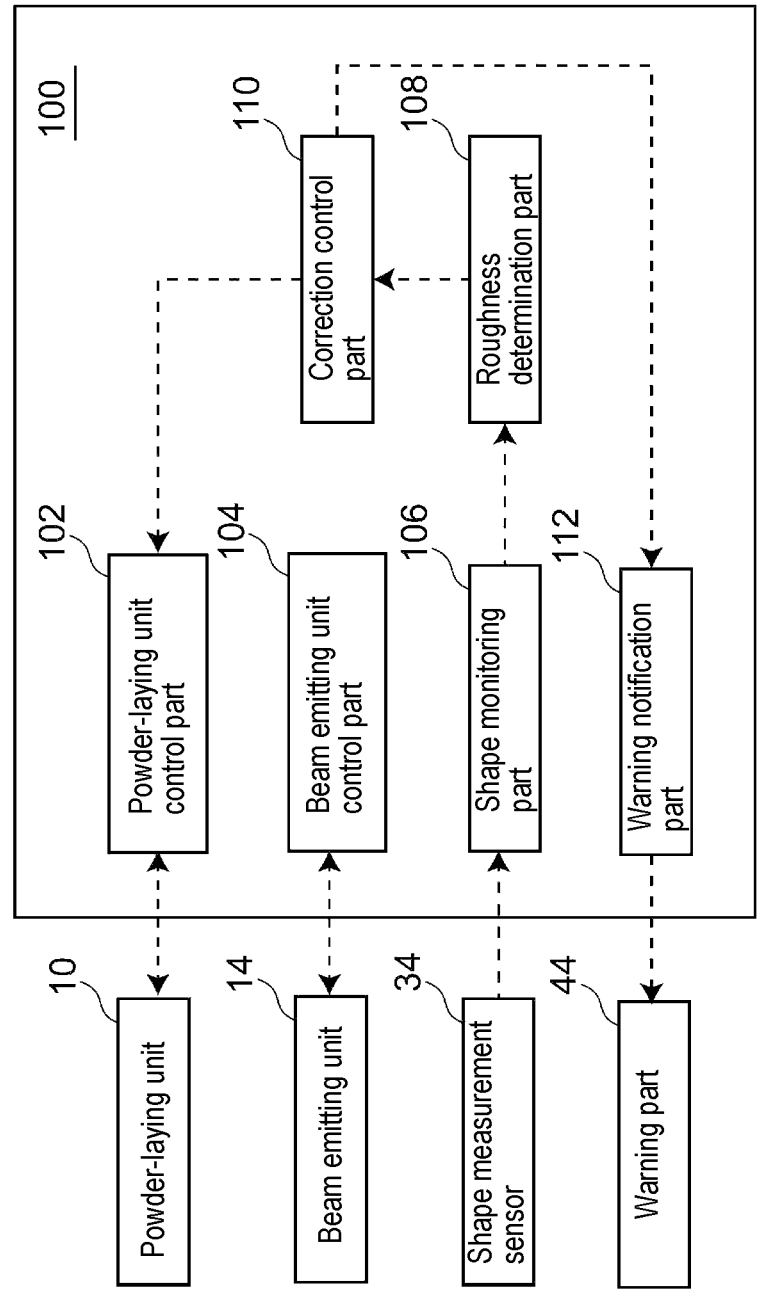
FIG. 4 is a block diagram functionally showing the internal configuration of a control device according to the first embodiment.
Figure 5:
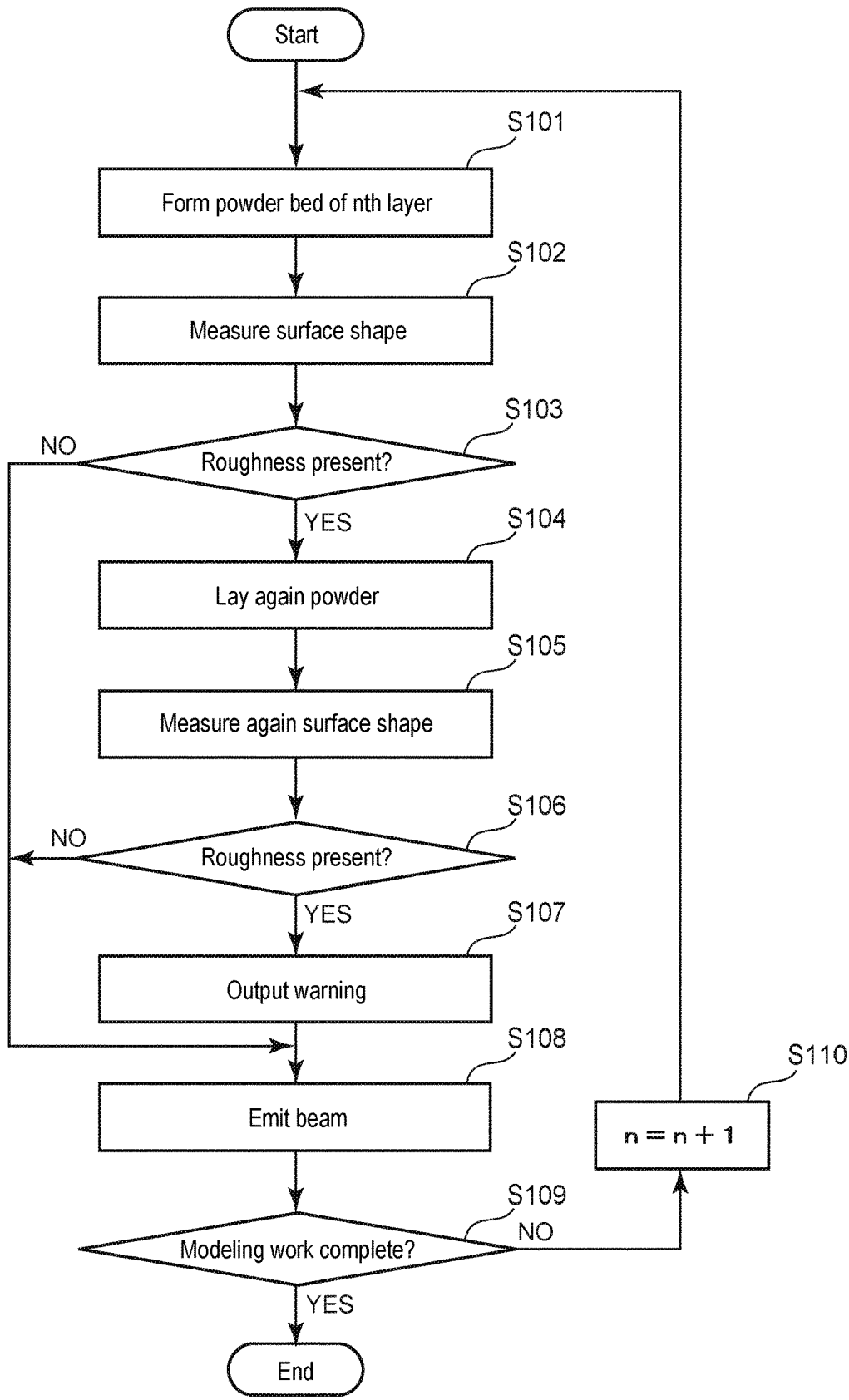
FIG. 5 is a flowchart showing steps of a three-dimensional additive manufacturing method performed by the control device in FIG. 4.

The three-dimensional additive manufacturing device 1 according to the first embodiment will be described with reference to FIGS. 4 and 5. FIG. 4 is a block diagram functionally showing the internal configuration of the control device 100 according to the first embodiment. FIG. 5 is a flowchart showing steps of the three-dimensional additive manufacturing method performed by the control device 100 in FIG. 4.

FIG. 4 representatively shows only a configuration related to control contents to be described later of the functional configurations of the control device 100, and other configurations may be included as needed.

As shown in FIG. 4, the control device 100 includes a powder-laying unit control part 102, a beam emitting unit control part 104, a shape monitoring part 106, a roughness determination part 108, a correction control part 110, and a warning notification part 112. The powder-laying unit control part 102 is provided to control the powder-laying unit 10. The beam emitting unit control part 104 is provided to control the beam emitting unit 14. The shape monitoring part 106 measures the shape of the powder bed 8 on the basis of a measurement result of the shape measurement sensor 34. The roughness determination part 108 determines the presence or absence of the roughness on the powder bed 8 on the basis of a monitoring result of the shape monitoring part 106. The correction control part 110 performs correction control on the basis of a determination result of the roughness determination part 108. The warning notification part 112 controls the warning part 44.

In the above-described control device 100, the three-dimensional additive manufacturing method according to the first embodiment is performed by these constituent elements functioning as follows. In the three-dimensional additive manufacturing method, modeling cycles are repeated in order to form a three-dimensional shaped product to be modeled. However, in the following description, an exemplary description will be given with a focus on the nth (n is an arbitrary natural number) modeling cycle.

First, the powder-laying unit control part 102 controls the powder-laying unit 10 to lay a powder on the base plate 2 or the powder bed 8 of the (n−1)th layer already laid on the base plate, and forms the powder bed 8 of the nth layer (step S101). The newly formed powder bed 8 has a layer thickness tn of, for example, several tens μm.

Subsequently, the shape monitoring part 106 measures the surface shape of the powder bed 8 by obtaining the measurement result from the shape measurement sensor 34 (step S102). At this time, the shape measurement sensor 34 measures the surface shape of the powder bed 8 as a three-dimensional structure by measurement based on the fringe production method as described above with reference to FIG. 3. Measurement data obtained by the shape measurement sensor 34 is sent to the shape monitoring part 106 as an electric signal.

Subsequently, the roughness determination part 108 determines whether there is the roughness on the powder bed 8 on the basis of the measurement result in step S102 (step S103). Such determination related to the presence or absence of the roughness is made by analyzing a surface structure of the powder bed 8 obtained by the shape monitoring part 106. In the present embodiment, if the detected roughness is out of an allowable range, the roughness determination part 108 determines that there is the roughness. The allowable range is set on the basis of whether the roughness on the powder bed 8 is a defect of an extent which is unallowable for product quality when the modeling cycle advances. In the present embodiment, for example, a range where the magnitude of the roughness (that is, a height difference between a bottom point of a concave portion and a top point of the convex portion) is not more than the thickness tn of the powder bed 8 to be formed by the powder-laying unit 10 in step S101 is set as the allowable range.

If the roughness determination part 108 determines that there is the roughness on the powder bed 8 (step S103: YES), the correction control part 110 lays again a powder so as to reduce the roughness on the powder bed 8 before emitting the beam to the powder bed 8 (step S104). That is, the powder-laying unit 10 performs redo (recoater) of a laying work of the powder bed 8 of the nth layer. Such a recoater work is performed by the powder-laying unit 10 which lays the powder bed 8 in step S101. However, another unit may be prepared. Further, in the recoater work, for example, the powder bed 8 of the nth layer may be formed again after temporarily removing the powder bed 8 where the roughness exists, or the powder bed 8 of the nth layer may be repaired by supplying an additional powder from the upper-layer side while leaving the powder bed 8 where the roughness exists.

After completion of re-laying of the powder, similarly to step S102, the shape monitoring part 106 measures again the surface shape of the powder bed 8 (step S105). Then, similarly to step S103, the roughness determination part 108 determines again whether there is the roughness on the powder bed 8 on the basis of the measurement result in step S105 (step S106). As a result, if the roughness still remains (Step S106: YES), the warning notification part 112 commands the warning part 44 to output a warning to urge a replacement work of a component (for example, a blade for the recoater) of the powder-laying unit 10 (Step S107). That is, if the roughness is not dissolved even by re-laying of the powder, a mechanical defect may exist in the powder-laying unit 10. In such a case, since these is a less chance of improvement even if a re-laying work is repeated, the warning to urge component replacement is made. The operator and the like is thus informed of a situation where it is difficult to dissolve the roughness by automatic control, it is possible to avoid an increasing fruitless operation time.

In the present embodiment, the case is exemplified in which the warning is made immediately if the roughness is not dissolved by re-laying of the powder. However, the recoater work may be repeated predetermined times before making the warning.

Then, if the roughness is dissolved by re-laying (step S106: NO), the beam emitting unit control part 104 controls the beam emitting unit 14 to perform modeling by emitting a beam to the powder bed 8 of the nth layer with a scanning pattern corresponding to the three-dimensional modeling product to be modeled (step S108). Then, the control device 100 determines whether a series of modeling works completes by sufficiently repeating the modeling cycle (step S109). If the modeling process is not complete (step S109:

NO), the control device 100 returns the process to step S101 to shift to the modeling process for the (n+1)th layer (step S110).

After that, if the modeling work is complete by sufficiently repeating the modeling cycle (step S109: YES), a non-destructive testing is performed as needed on the completed three-dimensional modeling product, and the series of modeling works is terminated (ended).

As described above, according to the first embodiment, the shape measurement sensor 34 monitors the roughness on the powder bed 8 to be an abnormality or a sign thereof. Then, the powder is laid again to reduce a roughness having the magnitude out of the allowable range before emission of the beam to the powder bed 8, if the shape measurement sensor 34 detects the roughness. Thus, it is possible to prevent, at an early stage, a roughness generated by a failure in laying a powder from becoming a fatal abnormality as the modeling work advances.

Moreover, since the mechanical defect in the powder-laying unit may exist if the roughness on the powder bed is not improved even by laying again the powder, the warning to urge component replacement is made. Thus, it is possible to avoid a modeling failure which is caused by advancing the modeling work while having a defect which cannot be overcome in terms of control.

Second Embodiment

Figure 6:
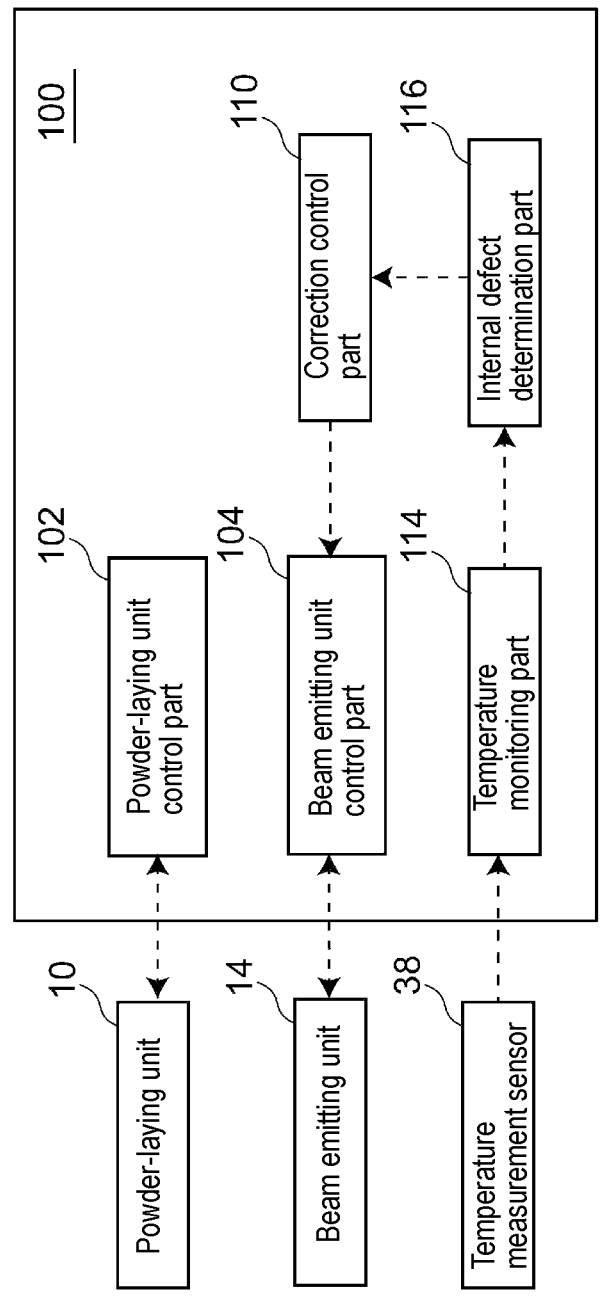
FIG. 6 is a block diagram functionally showing the internal configuration of the control device according to the second embodiment.
Figure 7:
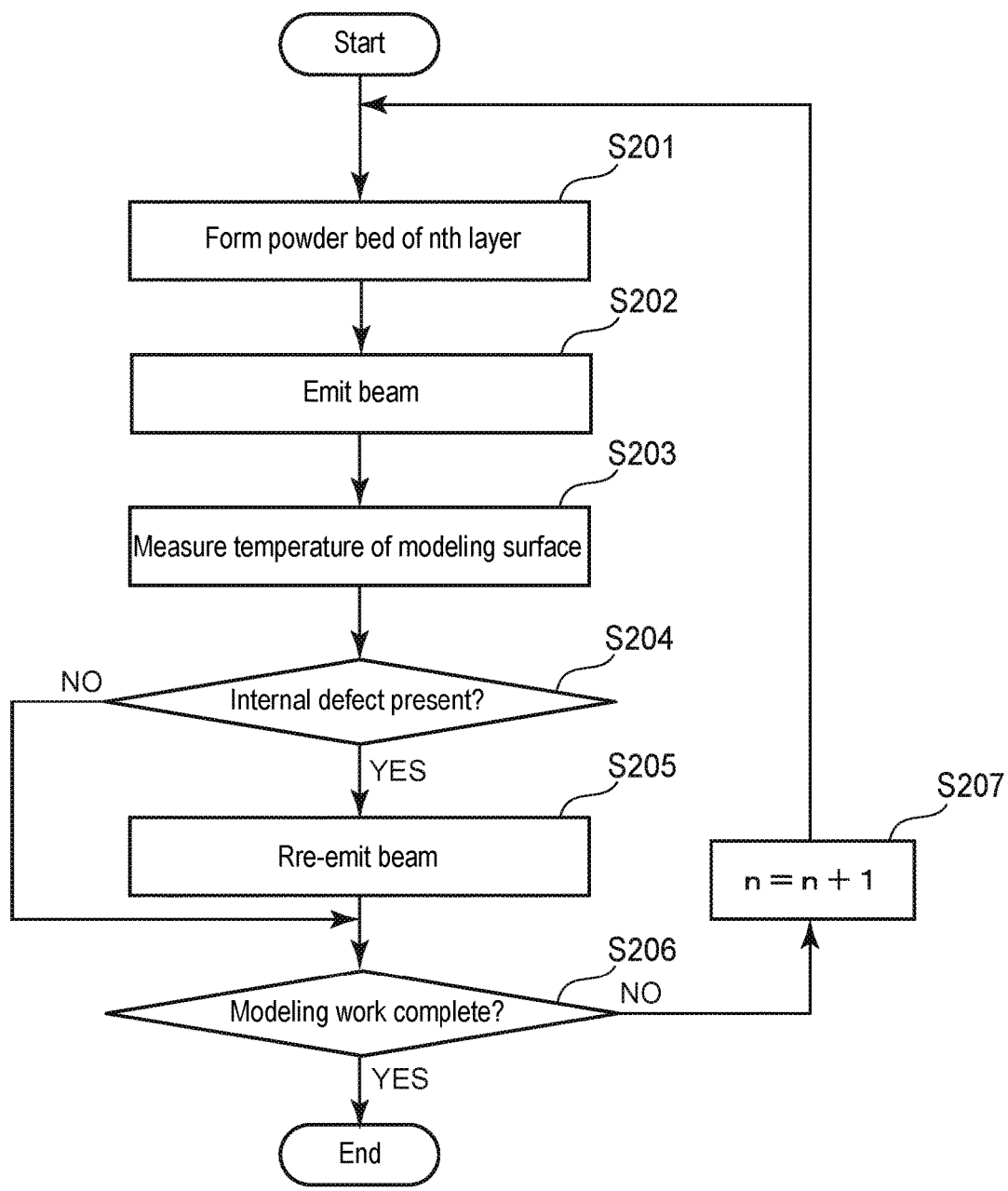
FIG. 7 is a flowchart showing steps of the three-dimensional additive manufacturing method performed by the control device in FIG. 6.
Figure 8:
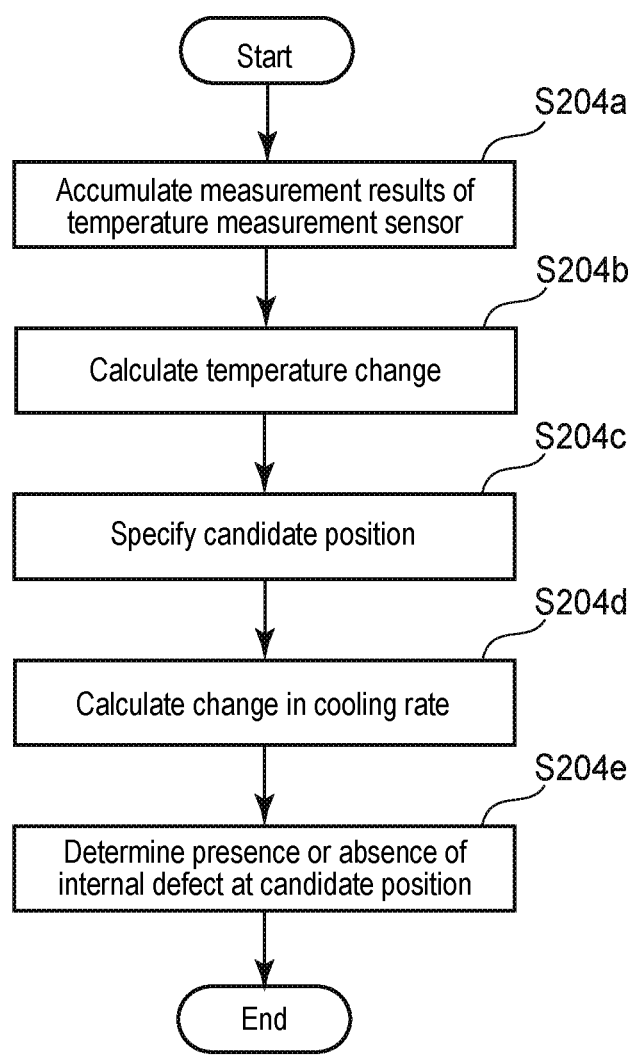
FIG. 8 is a flowchart showing a subroutine of step S204 in FIG. 7.

The three-dimensional additive manufacturing device 1 according to the second embodiment will be described with reference to FIGS. 6 to 8. FIG. 6 is a block diagram functionally showing the internal configuration of the control device 100 according to the second embodiment. FIG. 7 is a flowchart showing steps of the three-dimensional additive manufacturing method performed by the control device 100 in FIG. 6. FIG. 8 is a flowchart showing a subroutine of step S204 in FIG. 7.

In the following description, configurations corresponding to those in the above-described embodiment are associated with the same reference numerals, and not described again unless otherwise required.

As shown in FIG. 6, the control device 100 includes the powder-laying unit control part 102, the beam emitting unit control part 104, a temperature monitoring part 114, an internal defect determination part 116, and the correction control part 110. The powder-laying unit control part 102 is provided to control the powder-laying unit 10. The beam emitting unit control part 104 is provided to control the beam emitting unit 14. The temperature monitoring part 114 measures the temperature of the modeling surface on the basis of measurement results of the temperature measurement sensor (the first temperature measurement sensor 38a and the second temperature measurement sensor 38b). The internal defect determination part 116 determines the presence or absence of an internal defect on the basis of a monitoring result of the temperature monitoring part 114. The correction control part 110 performs correction control on the basis of a determination result of the internal defect determination part 116.

In the above-described control device 100, the three-dimensional additive manufacturing method according to the second embodiment is performed by these constituent elements functioning as follows. In the three-dimensional additive manufacturing method, modeling cycles are repeated in order to form a three-dimensional shaped product to be modeled. However, in the following description, an exemplary description will be given with a focus on the nth (n is an arbitrary natural number) modeling cycle.

First, the powder-laying unit control part 102 controls the powder-laying unit 10 to lay a powder on the base plate 2 or the powder bed 8 of the (n−1)th layer already laid on the base plate, and forms the powder bed 8 of the nth layer (step S201). The newly formed powder bed 8 has the layer thickness tn of, for example, several tens μm.

Subsequently, the beam emitting unit control part 104 controls the beam emitting unit 14 to perform modeling by emitting a beam to the powder bed 8 of the nth layer formed in step S201 with a scanning pattern corresponding to a three-dimensional shaped product to be modeled (step S202).

While the beam is scanned/emitted in step S202, the temperature monitoring part 114 measures the temperature of the modeling surface on the powder bed 8 by obtaining the measurement results from the temperature measurement sensor 38 (step S203). As described above, the three-dimensional additive manufacturing device 1 includes the first temperature measurement sensor 38a and the second temperature measurement sensor 38b as the temperature measurement sensor. The first temperature measurement sensor 38a measures the local temperature in the irradiated portion 39 where the beam is emitted. The second temperature measurement sensor 38b measures the temperature distribution in the detection target area 41 including the irradiated portion 39. The measurement results of the first temperature measurement sensor 38a and the second temperature measurement sensor 38b are obtained a plurality of times while the beam is scanned on the powder bed 8, and are accumulated in a storage means (not shown) such as a memory of the control device 100.

Subsequently, the internal defect determination part 116 determines whether there is the internal defect on the modeling surface on the basis of the measurement results in step S203 (step S204). Since a heat insulating effect is larger at a position where the internal defect exists than in surroundings thereof, the internal defect determination part 116 can determine the presence or absence of the internal defect on the basis of the measurement results of the first temperature measurement sensor 38a and the second temperature measurement sensor 38b. An example of an internal defect determination method in step S204 will be described here in detail with reference to FIG. 8.

First, the internal defect determination part 116 accumulates measurement values of the first temperature measurement sensor 38a and the second temperature measurement sensor 38b when the beam is scanned on the powder bed 8 (step S204a). The first temperature measurement sensor 38a detects a local temperature at a position where the beam is emitted along a scanning path of the beam (irradiated portion). The internal defect determination part 116 calculates a change amount of the local temperature at an in-plane position (step S204b) and specifies a position where the change amount is not less than a predetermined threshold as a candidate position where the internal defect exists (step S204c). The internal defect determination part 116 determines that an internal defect influencing the heat insulating effect is likely to exist at a position where the change amount of the local temperature is large. That is, when a local temperature in the molten pool formed by emitting a beam is continuously measured while scanning on the modeling surface, a temperature difference from an adjacent position where no defect exists is large due to a difference in heat insulating property if a defect exists in a lower portion of the pool. As described above, since the internal defect is likely to exist at the position where the change amount of the local temperature is larger than the surroundings thereof, the position is specified as the candidate position for the internal defect.

Subsequently, the internal defect determination part 116 calculates a cooling rate at the candidate position specified in step S204c on the basis of the measurement result of the second temperature measurement sensor 38b (step S204d) and determines that an internal defect exists at a position where the cooling rate is lower than the predetermined threshold (step S204e). The determination is made on the basis of the fact that the cooling rate is decreased since the heat insulating effect is larger at the position where the internal defect exists than in the surroundings thereof. As described above, at the position with the internal defects, since the heat insulating property increases due to the influence of a hollow existing in the lower portion of a beam emission position, the cooling rate also changes accordingly. Thus, at the position where the internal defect exists, comparing the cooling rate with that at the adjacent position thereof, the cooling rate changes more greatly than at the surrounding position where no internal defect exists.

The internal defect determination part 116 thus accurately determines the presence or absence of the internal defect on the basis of two perspectives, namely, the local temperature measured by the first temperature measurement sensor 38a and the cooling rate measured by the second temperature measurement sensor 38b.

In the present embodiment, the case is exemplified in which the determination is made on the basis of the two perspectives. However, the determination may be made on the basis of only one of the perspectives.

Referring back to FIG. 7, if the internal defect determination part 116 determines that there is the internal defect on the modeling surface by the above-described determination slow (step S204: YES), the beam emitting unit control part 104 controls the beam emitting unit 14 to emit again a beam to the position which is determined as having the internal defect (step S205). Consequently, the modeling surface at the position having the internal defect is melted again, eliminating the internal defect.

Beam re-emission conditions (output, scanning speed, hatch sense, focus, trajectory, and the like) in step S205 are preferably set on the basis of, for example, states (size, shape, position, and the like) of the internal defect determined in step S204. For example, in a case in which the internal defect is detected in the vicinity of a contour portion of the three-dimensional modeling product, the surface roughness degree of the three-dimensional modeling product may be deteriorated if a high-output/low-speed beam is emitted again to the position. Thus, it is preferable to set the emission conditions (it is preferable to, for example, lower the output of the beam or increase the scanning speed of the beam) so as to decrease an energy density per unit time supplied by the beam.

Then, the control device 100 determines whether a series of modeling works completes the process by sufficiently repeating the modeling cycle (step S206). If the modeling process is not complete (step S206: NO), the control device 100 returns the process to step S201 to shift to the modeling process for the (n+1)th layer (step S207).

After that, if the modeling work is complete by sufficiently repeating the modeling cycle (step S206: YES), the non-destructive testing is performed as needed on the completed three-dimensional shaped product, and the series of modeling works is terminated (ended).

As described above, according to the second embodiment, if the internal defect to be the abnormality or the sign thereof is detected by monitoring the temperature of the modeling surface where the beam is emitted, the correction work is performed at an early stage by re-emission of the beam. Thus, it is possible to perform the correction work in real time during the modeling work, achieving improvements in quality and production efficiency of the modeling product.

Third Embodiment

Figure 9:
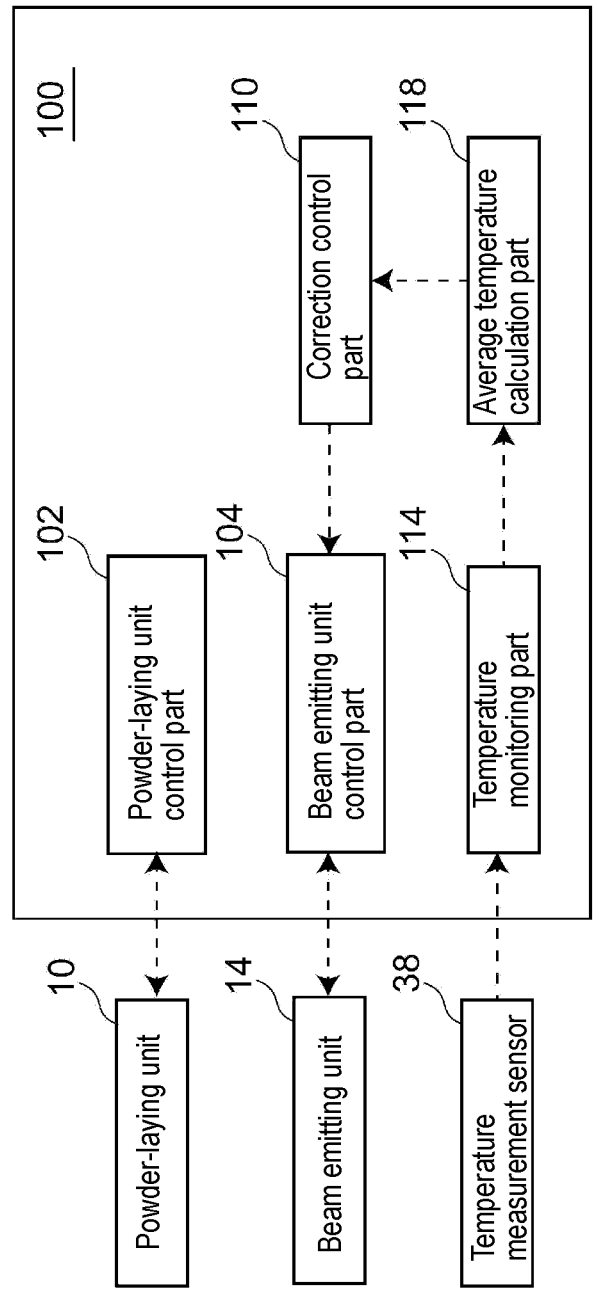
FIG. 9 is a block diagram functionally showing the internal configuration of the control device according to the third embodiment.
Figure 10:
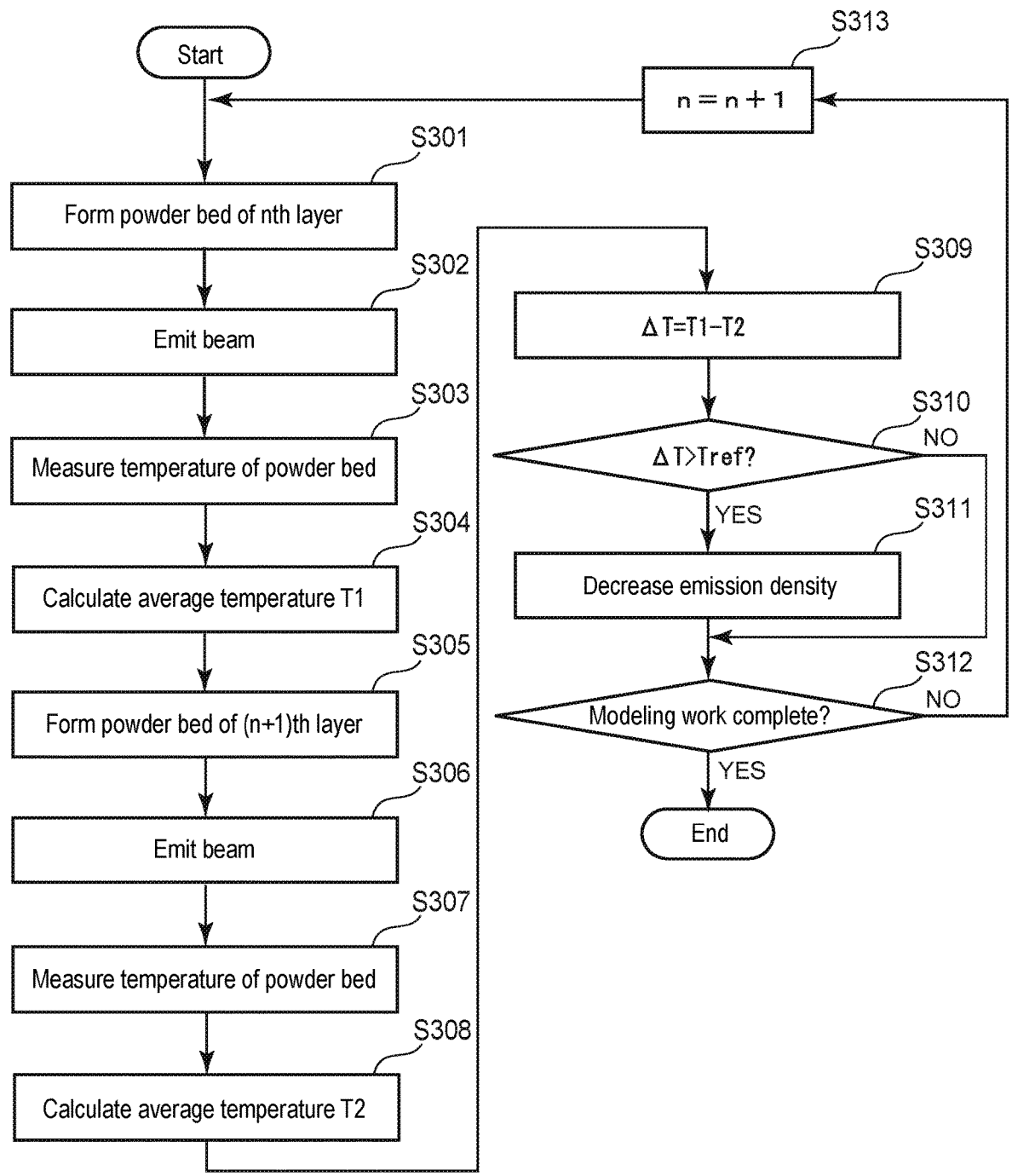
FIG. 10 is a flowchart showing steps of the three-dimensional additive manufacturing method performed by the control device in FIG. 9.

The three-dimensional additive manufacturing device 1 according to the third embodiment will be described with reference to FIGS. 9 and 10. FIG. 9 is a block diagram functionally showing the internal configuration of the control device 100 according to the third embodiment. FIG. 10 is a flowchart showing steps of the three-dimensional additive manufacturing method performed by the control device 100 in FIG. 9.

In the following description, configurations corresponding to those in the above-described embodiment are associated with the same reference numerals, and not described again unless otherwise required.

As shown in FIG. 9, the control device 100 includes the powder-laying unit control part 102, the beam emitting unit control part 104, the temperature monitoring part 114, an average temperature calculation part 118, and the correction control part 110. The powder-laying unit control part 102 is provided to control the powder-laying unit 10. The beam emitting unit control part 104 is provided to control the beam emitting unit 14. The temperature monitoring part 114 measures the temperature of the modeling surface on the basis of measurement results of the temperature measurement sensor (the first temperature measurement sensor 38a and the second temperature measurement sensor 38b). The average temperature calculation part 118 calculates the average temperature of the powder bed 8 on the basis of a monitoring result of the temperature monitoring part 114. The correction control part 110 performs correction control on the basis of a calculation result of the average temperature calculation part 118.

In the above-described control device 100, the three-dimensional additive manufacturing method according to the third embodiment is performed by these constituent elements functioning as follows. In the three-dimensional additive manufacturing method, modeling cycles are repeated in order to form a three-dimensional shaped product to be modeled. However, in the following description, an exemplary description will be given with a focus on the nth (n is an arbitrary natural number) modeling cycle.

First, the powder-laying unit control part 102 controls the powder-laying unit 10 to lay a powder on the base plate 2 or the powder bed 8 of the (n−1)th layer already laid on the base plate, and forms the powder bed 8 of the nth layer (step S301). The newly formed powder bed 8 has the layer thickness to of, for example, several tens μm.

Subsequently, the beam emitting unit control part 104 controls the beam emitting unit 14 to perform modeling by emitting a beam to the powder bed 8 of the nth layer formed in step S301 with a scanning pattern corresponding to a three-dimensional shaped product to be modeled (step S302).

While the beam is scanned/emitted in step S302, similarly to step S203 described above, the temperature monitoring part 114 measures the temperature of the powder bed 8 by obtaining the measurement result from at least one of the first temperature measurement sensor 38a and the second temperature measurement sensor 38b (step S303). Then, the average temperature calculation part 118 calculates an average temperature T1 on the powder bed 8 after the beam is emitted on the basis of the measurement result in step S303 (step S304).

Subsequently, in accordance with the same procedure as step S301, the powder-laying unit control part 102 lays the powder bed 8 of the (n+1)th layer on the upper-layer side (step S305). Then, similarly to step S302, the beam is emitted to the powder bed 8 of the (n+1)th layer (step S306). Then, similarly to step S303, the temperature of the powder bed 8 is measured (step S307), and the average temperature calculation part 118 calculates again an average temperature T2 on the powder bed 8 after the beam is emitted (step S308).

Subsequently, the correction control part 110 calculates a difference ΔT between the average temperature T1 calculated in step S304 and the average temperature T2 calculated in step S308 (step S309), and determines whether the difference ΔT is larger than a reference value ΔTref (step S310). If the difference ΔT is larger than the reference value ΔTref (step S310: YES), the correction control part 110 gives a correction instruction to the beam emitting unit control part 104 so as to decrease an emission density of the beam emitted by the beam emitting unit 14 (S311). If beam emission is repeated in accordance with the modeling cycle, a thermal quantity is gradually accumulated in the three-dimensional shaped product being modeled, and quality may vary considerably in a stacking height direction due to an increase in average temperature of the modeling surface. By contrast, it is possible to suppress the quality variations in the stacking height direction by thus performing control to decrease the beam emission density if it is determined that accumulation of the thermal quantity on the modeling surface increases since the difference ΔT is larger than the reference value ΔTref.

The decrease in beam emission density in step S311 may be a spatial decrease or may be a temporal decrease. An increase in average temperature of the modeling surface is preferably suppressed by, for example, setting an output level of the beam by the beam emitting unit 14 to be lower than that of standard time or extending a time interval when the beam is emitted. Such correction control by the correction control part 110 may automatically be released to return to normal control if the average temperature is sufficiently decreased on the basis of the measurement result of the temperature monitoring part.

Then, the control device 100 determines whether a series of modeling works completes the process by sufficiently repeating the modeling cycle (step S312). If the modeling process is not complete (step S312: NO), the control device 100 returns the process to step S301 to shift to the modeling process for the (n+1)th layer (step S313).

After that, if the modeling work is complete by sufficiently repeating the modeling cycle (step S312: YES), the non-destructive testing is performed as needed on the completed three-dimensional shaped product, and the series of modeling works is terminated (ended).

As described above, according to the third embodiment, if the accumulation of the thermal quantity on the modeling surface increases through monitoring the average temperature of the modeling surface where the beam is emitted, the beam emission density is adjusted. Thus, it is possible to suppress variations in a stacking direction due to the accumulation of the thermal quantity and to perform three-dimensional additive manufacturing with stable quality. As a result, it is possible to effectively reduce a risk of causing a modeling defect when the modeling work advances.

Fourth Embodiment

Figure 11:
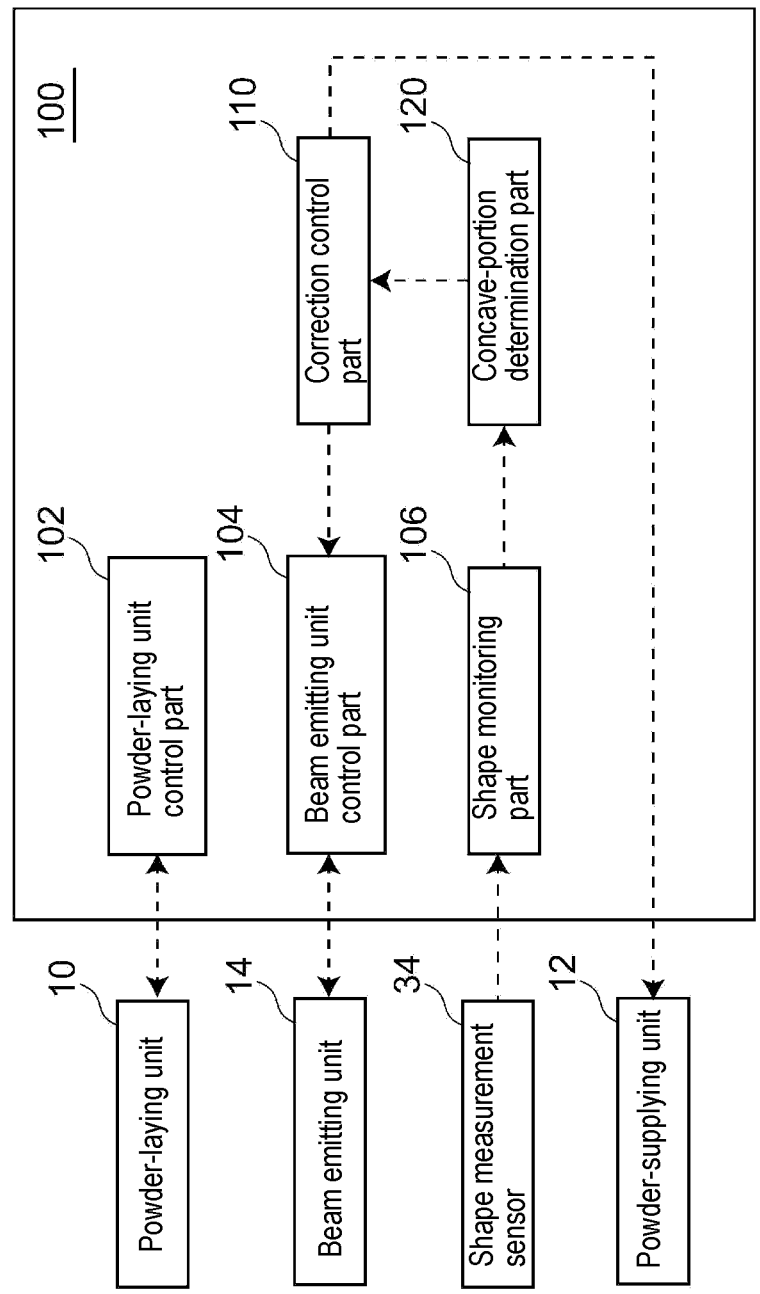
FIG. 11 is a block diagram functionally showing the internal configuration of the control device according to the fourth embodiment.
Figure 12:
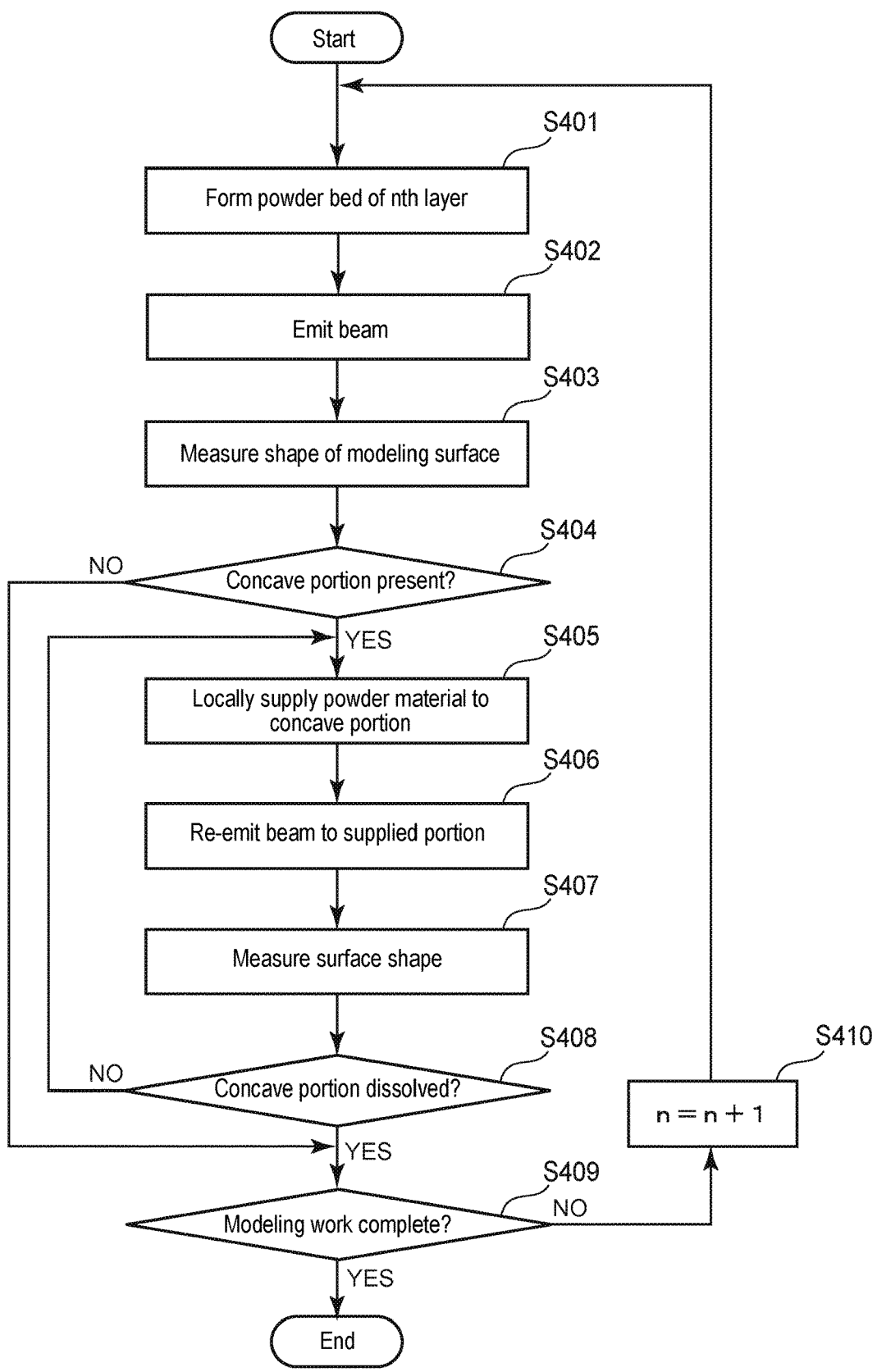
FIG. 12 is a flowchart showing steps of the three-dimensional additive manufacturing method performed by the control device in FIG. 11.

The three-dimensional additive manufacturing device 1 according to the fourth embodiment will be described with reference to FIGS. 11 and 12. FIG. 11 is a block diagram functionally showing the internal configuration of the control device 100 according to the fourth embodiment. FIG. 12 is a flowchart showing steps of the three-dimensional additive manufacturing method performed by the control device 100 in FIG. 11.

In the following description, configurations corresponding to those in the above-described embodiment are associated with the same reference numerals, and not described again unless otherwise required.

As shown in FIG. 11, the control device 100 includes the powder-laying unit control part 102, the beam emitting unit control part 104, the shape monitoring part 106, a concave-portion determination part 120, and the correction control part 110. The powder-laying unit control part 102 is provided to control the powder-laying unit 10. The beam emitting unit control part 104 is provided to control the beam emitting unit 14. The shape monitoring part 106 measures the shape of the modeling surface on the basis of the measurement result of the shape measurement sensor 34. The concave-portion determination part 120 determines the presence or absence of a concave portion on the modeling surface on the basis of a monitoring result of the shape monitoring part 106. The correction control part 110 performs correction control on the basis of a determination result of the concave-portion determination part 120.

In the above-described control device 100, the three-dimensional additive manufacturing method according to the fourth embodiment is performed by these constituent elements functioning as follows. In the three-dimensional additive manufacturing method, modeling cycles are repeated in order to form a three-dimensional shaped product to be modeled. However, in the following description, an exemplary description will be given with a focus on the nth (n is an arbitrary natural number) modeling cycle.

First, the powder-laying unit control part 102 controls the powder-laying unit 10 to lay a powder on the base plate 2 or the powder bed 8 of the (n−1)th layer already laid on the base plate, and forms the powder bed 8 of the nth layer (step S401). The newly formed powder bed 8 has the layer thickness to of, for example, several tens μm.

Subsequently, the beam emitting unit control part 104 controls the beam emitting unit 14 to perform modeling by emitting a beam to the powder bed 8 of the nth layer formed in step S401 with a scanning pattern corresponding to a three-dimensional shaped product to be modeled (step S402).

Subsequently, similarly to step S102 described above, the shape monitoring part 106 measures the shape of the modeling surface by obtaining the measurement result from the shape measurement sensor 34 (step S403). At this time, the shape measurement sensor 34 measures the surface shape of the modeling surface as a three-dimensional structure by measurement based on the fringe production method as described above with reference to FIG. 3. Measurement data obtained by the shape measurement sensor 34 is sent to the shape monitoring part 106 as an electric signal.

Subsequently, the concave-portion determination part 120 determines whether there is the concave portion on the modeling surface on the basis of the measurement result in step S403 (step S404). Such determination is made by analyzing the three-dimensional structure of the modeling surface obtained by the shape monitoring part 106 to extract the concave portion. In the present embodiment, if the size of the extracted concave portion (that is, the depth, width, or the like of the concave portion) is out of an allowable range, the concave-portion determination part 120 determines that there is the concave portion.

The allowable range to be a determination criteria in step S404 is set on the basis of whether the concave portion existing on the modeling surface can be a fatal modeling defect for product quality as the modeling cycle advances. In the present embodiment, as an example, the allowable range is defined as a range which is not more than the thickness to of the powder bed 8 per layer formed by the powder-laying unit 10 in step S401.

If the concave-portion determination part 120 determines that there is the concave portion (step S404: YES), the correction control part 110 controls the powder-supplying unit 12 to selectively (locally) supply the powder to the concave portion detected by the shape measurement sensor 34 (step S405). Consequently, the concave portion existing on the modeling surface is filled with the powder selectively supplied from the powder-supplying unit 12.

In the present embodiment, the powder-supplying unit 12 locally supplies the powder to a position where the concave portion exists. However, the powder-laying unit 10 may supply a powder to a wide range including the position where the concave portion exits.

Subsequently, the correction control part 110 instructs the beam emitting unit control part 104 to emit a beam to the powder supplied in step S405 (step S406). Consequently, the powder filling the concave portion is hardened, eliminating the concave portion. The correction work for the concave portion found on the modeling surface is thus performed automatically in the middle of the modeling work, making it possible to prevent, at an early stage, the concave portion from becoming a quality problem as the modeling work advances.

After that, similarly to step S403, the shape monitoring part 106 measures again the shape of the modeling surface (step S407). Then, similarly to step S404, the concave-portion determination part 120 determines again whether there is the concave portion on the modeling surface on the basis of the measurement result in step S407 (step S408). As a result, if the concave portion still exists (step S408: YES), the process returns to step S405 to make correction by performing again the above-described steps.

Then, if the concave portion is dissolved (step S408: NO), the control device 100 determines whether a series of modeling works completes the process by sufficiently repeating the modeling cycle (step S409). If the modeling process is not complete (step S409: NO), the control device 100 returns the process to step S401 to shift to the modeling process for the (n+1)th layer (step S410).

After that, if the modeling work is complete by sufficiently repeating the modeling cycle (step S409: YES), the non-destructive testing is performed as needed on the completed three-dimensional shaped product, and the series of modeling works is terminated (ended).

As described above, according to the fourth embodiment, the shape measurement sensor 34 monitors the roughness on the modeling surface to be a factor indicating a sign of the modeling failure. As a result, if the concave portion is detected on the modeling surface, the powder-supplying unit 12 selectively supplies a powder to the concave portion, and the beam is emitted to the supplied powder, thereby repairing the concave portion. Since the concave portion existing on the modeling surface is thus repaired automatically in the middle of the modeling work, it is possible to prevent, at an early stage, the concave portion from becoming an abnormality to be the quality problem as the modeling work advances.

Fifth Embodiment

Figure 13:
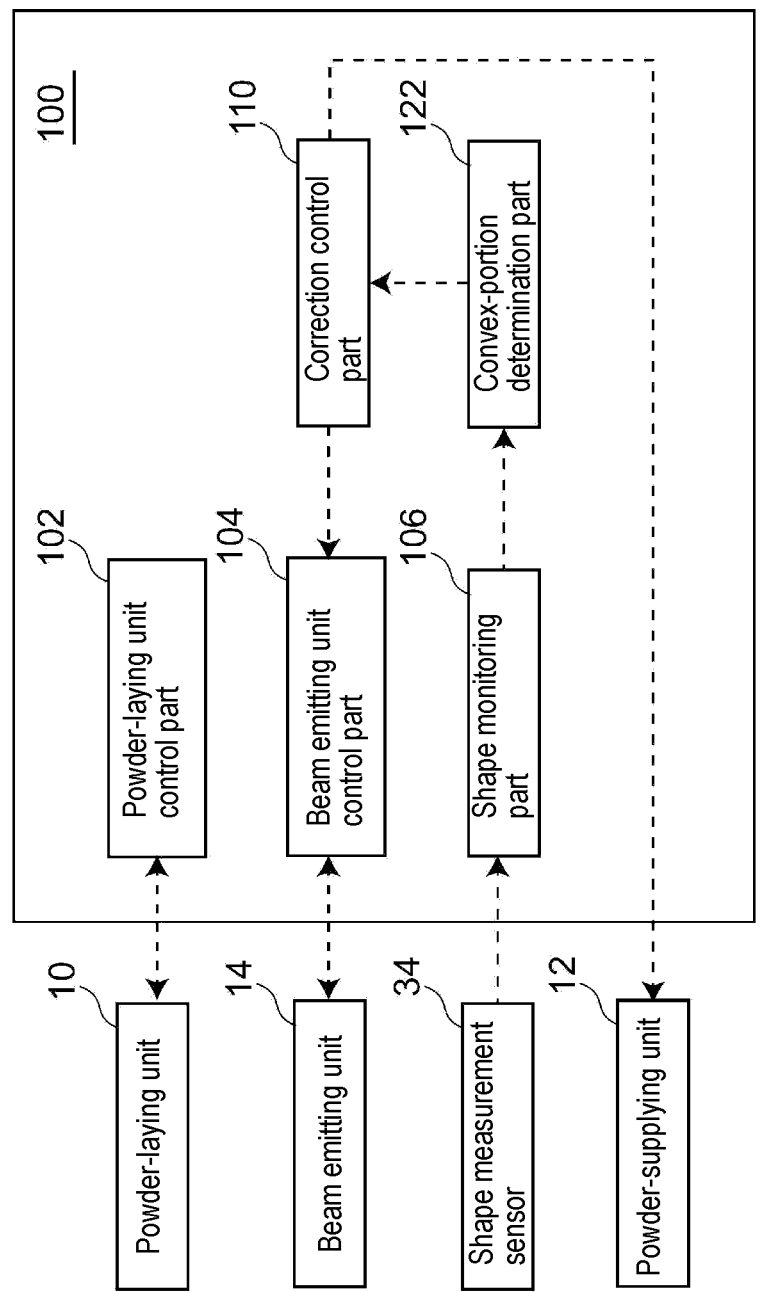
FIG. 13 is a block diagram functionally showing the internal configuration of the control device according to the fifth embodiment.
Figure 14:
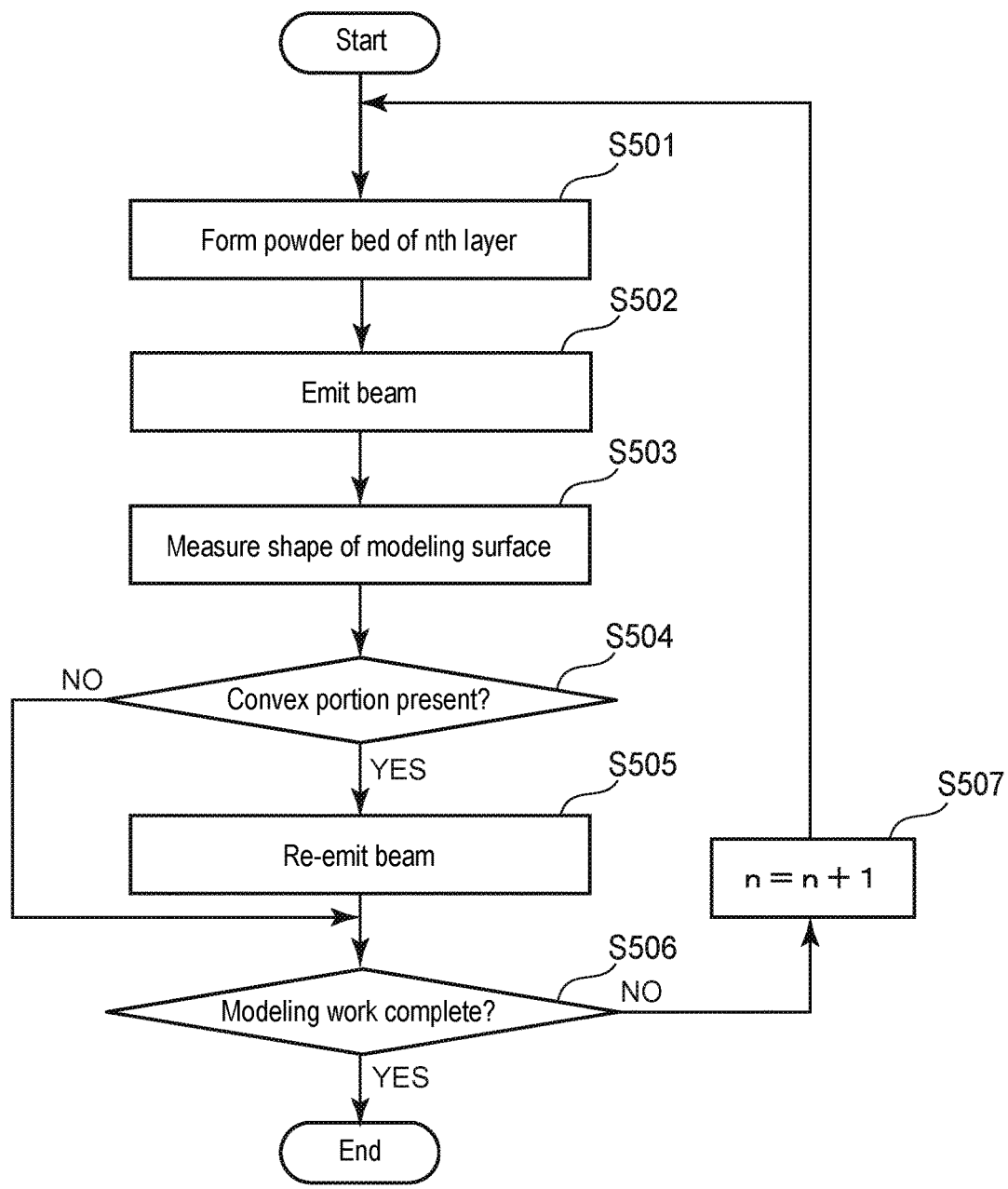
FIG. 14 is a flowchart showing steps of the three-dimensional additive manufacturing method performed by the control device in FIG. 13.

The three-dimensional additive manufacturing device 1 according to the fifth embodiment will be described with reference to FIGS. 13 and 14. FIG. 13 is a block diagram functionally showing the internal configuration of the control device 100 according to the fifth embodiment. FIG. 14 is a flowchart showing steps of the three-dimensional additive manufacturing method performed by the control device 100 in FIG. 13.

In the following description, configurations corresponding to those in the above-described embodiment are associated with the same reference numerals, and not described again unless otherwise required.

As shown in FIG. 13, the control device 100 includes the powder-laying unit control part 102, the beam emitting unit control part 104, the shape monitoring part 106, a convex-portion determination part 122, and the correction control part 110. The powder-laying unit control part 102 is provided to control the powder-laying unit 10. The beam emitting unit control part 104 is provided to control the beam emitting unit 14. The shape monitoring part 106 measures the shape of the modeling surface on the basis of the measurement result of the shape measurement sensor 34. The convex-portion determination part 122 determines the presence or absence of the convex portion on the modeling surface on the basis of the monitoring result of the shape monitoring part 106. The correction control part 110 performs correction control on the basis of a determination result of the convex-portion determination part 122.

In the above-described control device 100, the three-dimensional additive manufacturing method according to the fifth embodiment is performed by these constituent elements functioning as follows. In the three-dimensional additive manufacturing method, modeling cycles are repeated in order to form a three-dimensional shaped product to be modeled. However, in the following description, an exemplary description will be given with a focus on the nth (n is an arbitrary natural number) modeling cycle.

First, the powder-laying unit control part 102 controls the powder-laying unit 10 to lay a powder on the base plate 2 or the powder bed 8 of the (n−1)th layer already laid on the base plate, and forms the powder bed 8 of the nth layer (step S501). The newly formed powder bed 8 has the layer thickness tn of, for example, several tens μm.

Subsequently, the beam emitting unit control part 104 controls the beam emitting unit 14 to perform modeling by emitting a beam to the powder bed 8 of the nth layer formed in step S501 with a scanning pattern corresponding to a three-dimensional shaped product to be modeled (step S502).

Subsequently, similarly to step S102 described above, the shape monitoring part 106 measures the shape of the modeling surface by obtaining the measurement result from the shape measurement sensor 34 (step S503). At this time, the shape measurement sensor 34 measures the surface shape of the modeling surface as a three-dimensional structure by measurement based on the fringe production method as described above with reference to FIG. 3. Measurement data obtained by the shape measurement sensor 34 is sent to the shape monitoring part 106 as an electric signal.

Subsequently, the convex-portion determination part 122 determines whether there is the convex portion on the modeling surface on the basis of the measurement result in step S503 (step S504). Such determination is made by analyzing the three-dimensional structure obtained by the shape monitoring part 106 to extract the convex portion. In the present embodiment, if the size of the extracted convex portion (that is, the height, width, or the like of the convex portion) is out of an allowable range, the convex-portion determination part 122 determines that there is the convex portion.

The allowable range to be a determination criteria in step S504 is set on the basis of whether the convex portion existing on the modeling surface can be a fatal modeling defect for product quality as the modeling cycle advances. In the present embodiment, as an example, the allowable range is defined as a range which is not more than the thickness tn of the powder bed 8 per layer formed by the powder-laying unit 10 in step S501.

If the convex-portion determination part 122 determines that there is the convex portion on the modeling surface (step S504: YES), the correction control part 110 instructs the beam emitting unit control part 104 to selectively (locally) emit again the beam, by the beam emitting unit 14, to the convex portion detected by the shape measurement sensor 34 (step S505). Consequently, a portion where the beam is emitted is melted, dissolving the convex portion. Thus, it is possible to prevent, at an early stage, the convex portion from growing into a modeling defect as the modeling work advances and to effectively reduce the risk of the modeling failure.

The beam re-emission in step S505 may be performed a plurality of times if it is difficult to dissolve the convex portion with one-time emission due to the output of the beam. Further, a process of confirming whether the convex portion is dissolved may be performed after step S505 is performed. In this case, if the convex portion is not dissolved, step S505 may be performed again, or a warning to urge component replacement of the beam emitting unit 14 may be output.

Moreover, in a case in which the convex portion is formed such that the contour portion (edge portion) of the three-dimensional shaped product bulges, the surface shape may be lost by normal beam emission when the beam is emitted again in step S505. Accordingly, the focus, the output, the scanning speed, the hatch interval, and the like of the beam may be adjusted.

Subsequently, the control device 100 determines whether a series of modeling works completes the process by sufficiently repeating the modeling cycle (step S506). If the modeling process is not complete (step S506: NO), the control device 100 returns the process to step S501 to shift to the modeling process for the (n+1)th layer (step S507).

After that, if the modeling work is complete by sufficiently repeating the modeling cycle (step S506: YES), the non-destructive testing is performed as needed on the completed three-dimensional shaped product, and the series of modeling works is terminated (ended).

As described above, according to the fifth embodiment, if the shape measurement sensor 34 detects the convex portion on the modeling surface, the repair work is performed automatically by emitting the beam to the convex portion to be melted. Since the convex portion existing on the modeling surface is thus repaired in the middle of the modeling work, it is possible to prevent, at an early stage, the convex portion from becoming a quality problem as the modeling work advances. The convex portion may be formed such that the modeling surface partially bulges during the modeling work, which causes damage to the powder-laying unit 10 and the powder-supplying unit 12. The three-dimensional additive manufacturing device 1 of this type is particularly effective in preventing such a defect.

Sixth Embodiment

Figure 15:
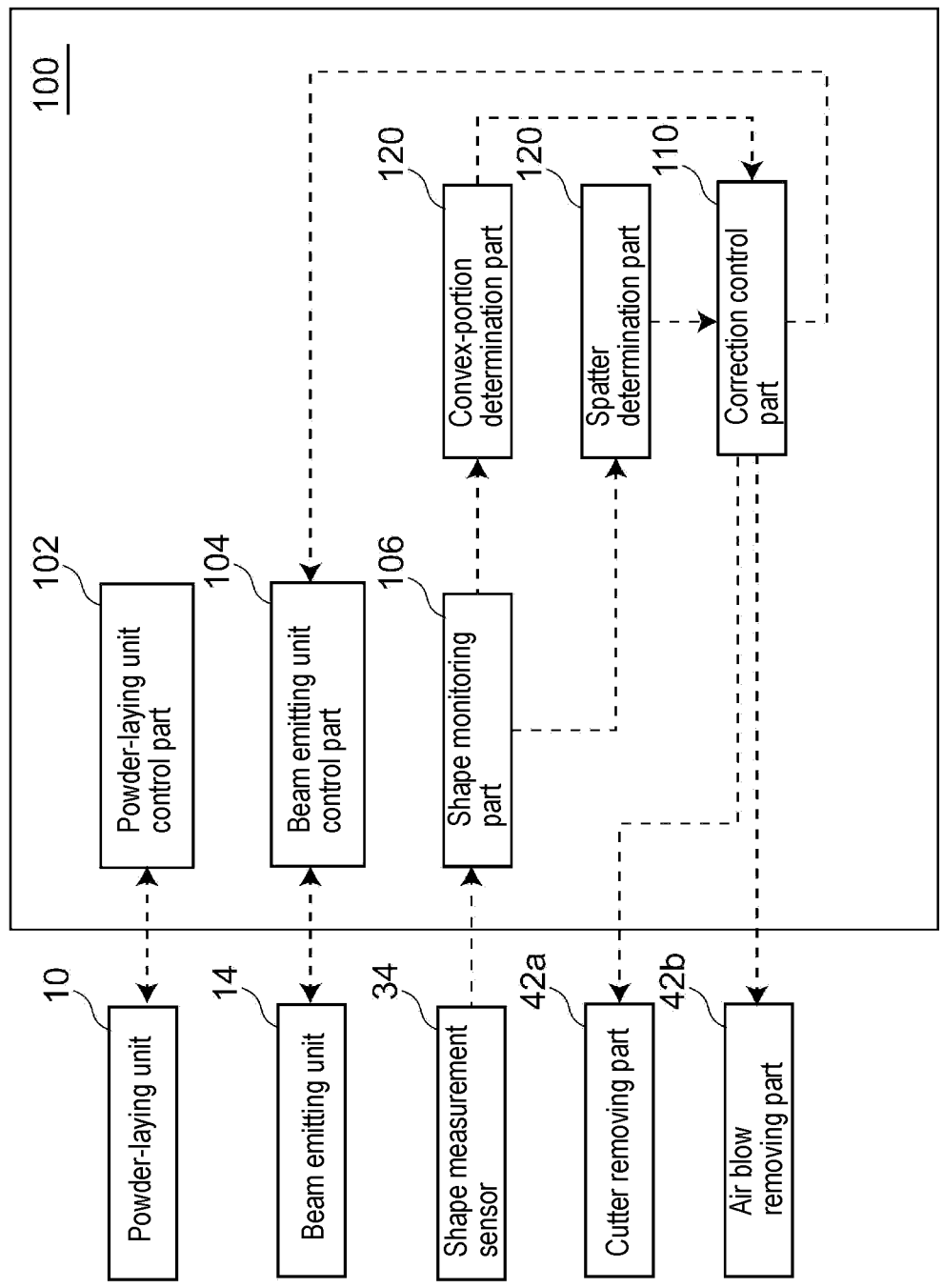
FIG. 15 is a block diagram functionally showing the internal configuration of the control device according to the sixth embodiment.
Figure 16:
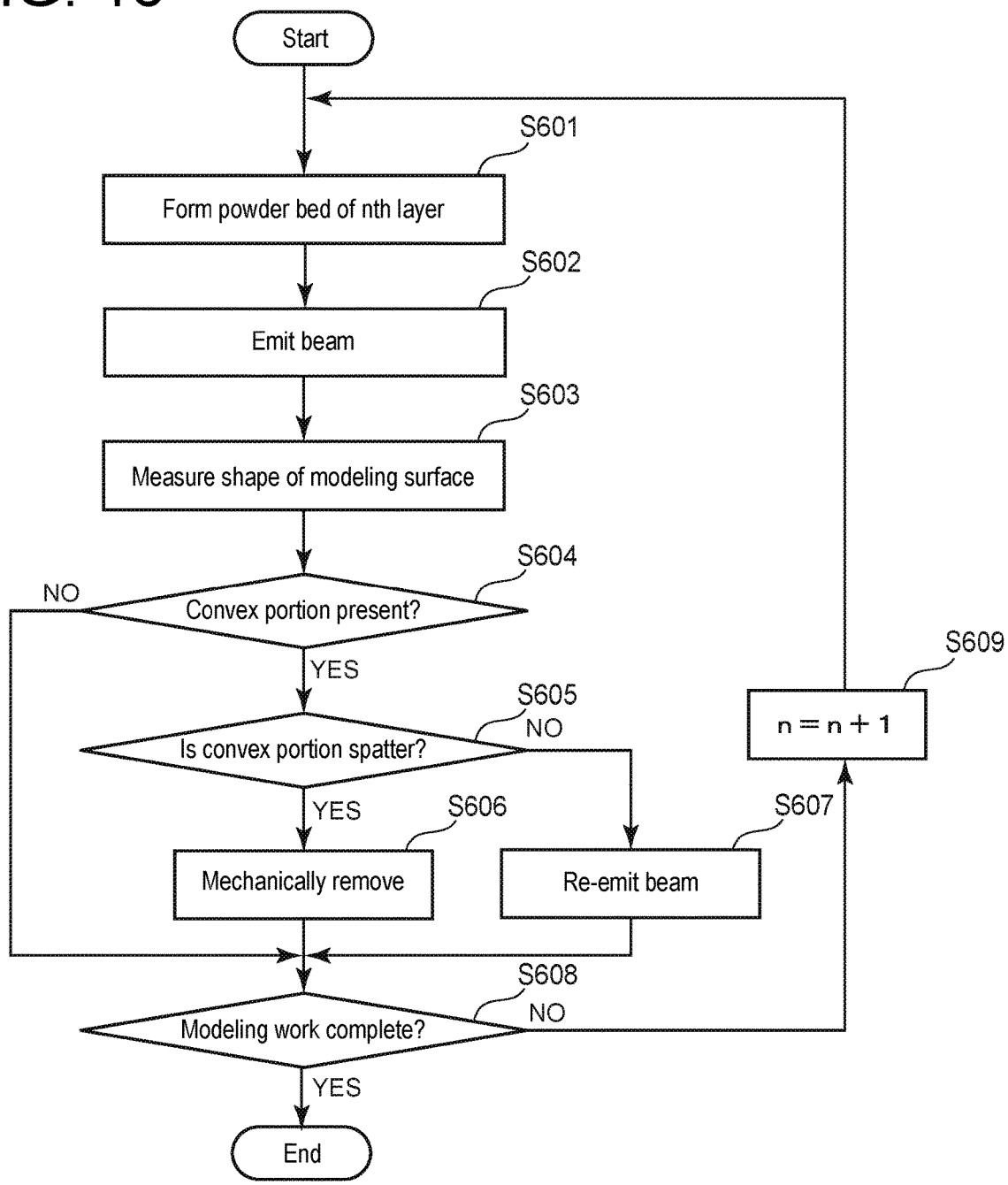
FIG. 16 is a flowchart showing steps of the three-dimensional additive manufacturing method performed by the control device in FIG. 15.

The three-dimensional additive manufacturing device 1 according to the sixth embodiment will be described with reference to FIGS. 15 and 16. FIG. 15 is a block diagram functionally showing the internal configuration of the control device 100 according to the sixth embodiment. FIG. 16 is a flowchart showing steps of the three-dimensional additive manufacturing method performed by the control device 100 in FIG. 15.

In the following description, configurations corresponding to those in the above-described embodiment are associated with the same reference numerals, and not described again unless otherwise required.

As shown in FIG. 15, the control device 100 includes the powder-laying unit control part 102, the beam emitting unit control part 104, the shape monitoring part 106, the convex-portion determination part 122, a spatter determination part 124, and the correction control part 110. The powder-laying unit control part 102 is provided to control the powder-laying unit 10. The beam emitting unit control part 104 is provided to control the beam emitting unit 14. The shape monitoring part 106 measures the shape of the modeling surface on the basis of the measurement result of the shape measurement sensor 34. The convex-portion determination part 122 determines the presence or absence of the convex portion on the modeling surface on the basis of the monitoring result of the shape monitoring part 106. The spatter determination part 124 determines whether the convex portion detected by the convex-portion determination part 122 is a spatter. The correction control part 110 performs correction control on the basis of determination results of the convex-portion determination part 122 and the spatter determination part 124.

In the above-described control device 100, the three-dimensional additive manufacturing method according to the sixth embodiment is performed by these constituent elements functioning as follows. In the three-dimensional additive manufacturing method, modeling cycles are repeated in order to form a three-dimensional shaped product to be modeled. However, in the following description, an exemplary description will be given with a focus on the nth (n is an arbitrary natural number) modeling cycle.

First, the powder-laying unit control part 102 controls the powder-laying unit 10 to lay a powder on the base plate 2 or the powder bed 8 of the (n−1)th layer already laid on the base plate, and forms the powder bed 8 of the nth layer (step S601). The newly formed powder bed 8 has the layer thickness to of, for example, several tens μm.

Subsequently, the beam emitting unit control part 104 controls the beam emitting unit 14 to perform modeling by emitting a beam to the powder bed 8 of the nth layer formed in step S601 with a scanning pattern corresponding to a three-dimensional shaped product to be modeled (step S602).

Subsequently, similarly to step S102 described above, the shape monitoring part 106 measures the shape of the modeling surface by obtaining the measurement result from the shape measurement sensor 34 (step S603). At this time, the shape measurement sensor 34 measures the surface shape of the modeling surface as a three-dimensional structure by measurement based on the fringe production method as described above with reference to FIG. 3. Measurement data obtained by the shape measurement sensor 34 is sent to the shape monitoring part 106 as an electric signal.

Subsequently, the convex-portion determination part 122 determines whether there is the convex portion on the modeling surface on the basis of the measurement result in step S603 (step S604). Such determination is made by analyzing the three-dimensional structure obtained by the shape monitoring part 106 to extract the convex portion. In the present embodiment, if the size of the extracted convex portion (that is, the height, width, or the like of the convex portion) is out of an allowable range, the convex-portion determination part 122 determines that there is the convex portion.

The allowable range to be a determination criteria in step S604 is set on the basis of whether the convex portion existing on the modeling surface can be a fatal modeling defect for product quality as the modeling cycle advances. In the present embodiment, as an example, the allowable range is defined as a range which is not more than the thickness to of the powder bed 8 per layer formed by the powder-laying unit 10 in step S601.

If the convex-portion determination part 122 determines that there is the convex portion on the modeling surface (step S604: YES), the spatter determination part 124 determines whether the convex portion is the spatter (step S605). The determination may be made on the basis of whether a projected area of a convex deformation amount (a projected area of the convex portion) generated on the surface of the powder bed after beam emission is not more than an expected particle size of the spatter. A reference particle size of the spatter can be set in correspondence with a formation mode of the spatter. For example, in the case in which the spatter is formed by scattering from the molten pool formed by emitting the beam to the powder bed to be solidified, the spatter is expected to have the relatively large particle size of about 150 µm to 300 µm. Thus, it is possible to determine that the spatter locally exists if the convex portion has the projected area of not more than 300 µm×300 µm.

If the convex portion is the spatter (step S605: YES), the correction control part 110 mechanically removes the convex portion by using the convex-portion removing unit 42 (at least one of the cutter removing part 42a and the air blow removing part 42b). If the convex portion is the spatter, since the spatter contains the relatively high percentage of the oxide generated when the powder is melted, the oxide is mechanically removed so as not to blend into the modeling product, making it possible to implement good modeling quality.

Attention is preferably paid to the possibility that if a cutter blade of the cutter removing part 42a is damaged by hitting a bulging portion of a modeling article, a replacement work may be required, or a damaged portion of the cutter may blend into the modeling article and become a foreign substance (contamination), while a thickness variation of a next layer is reduced, and the modeling quality is improved thanks to good flatness accuracy of the modeling surface after the removal by the cutter.

Attention is preferably paid to the possibility that the air blow removing part 42b may blow away a powder other than the spatter around the modeling article although the air blow removing part 42b can remove only the spatter even if there is the bulging portion of the modeling article as in the case of the cutter removing part 42a, and thus accurate positioning is needed.

On the other hand, if the convex portion is not the spatter (step S605: NO), similarly to step S505 described above, the correction control part 110 instructs the beam emitting unit control part 104 to selectively (locally) emit again the beam, by the beam emitting unit 14, to the convex portion detected by the shape measurement sensor 34 (step S607). Consequently, the portion where the beam is emitted is melted, dissolving the convex portion.

Subsequently, the control device 100 determines whether a series of modeling works completes the process by sufficiently repeating the modeling cycle (step S608). If the modeling process is not complete (step S608: NO), the control device 100 returns the process to step S601 to shift to the modeling process for the (n+1)th layer (step S609).

After that, if the modeling work is complete by sufficiently repeating the modeling cycle (step S608: YES), the non-destructive testing is performed as needed on the completed three-dimensional shaped product, and the series of modeling works is terminated (ended).

As described above, according to the sixth embodiment, it is determined whether the convex portion generated on the modeling surface is the spatter, and the two different convex-portion removing methods are used on the basis of the determination result. If the convex portion is the spatter, since the spatter contains the relatively high percentage of the oxide generated when the powder is melted, the convex removing unit mechanically removes the oxide to prevent the oxide from blending into the modeling product. On the other hand, there is no such a concern if the convex portion is not the spatter, and thus the convex portion is removed by emitting the beam to the convex portion. It is possible to effectively prevent the modeling failure while thus ensuring the modeling quality.

Seventh Embodiment

Figure 17:
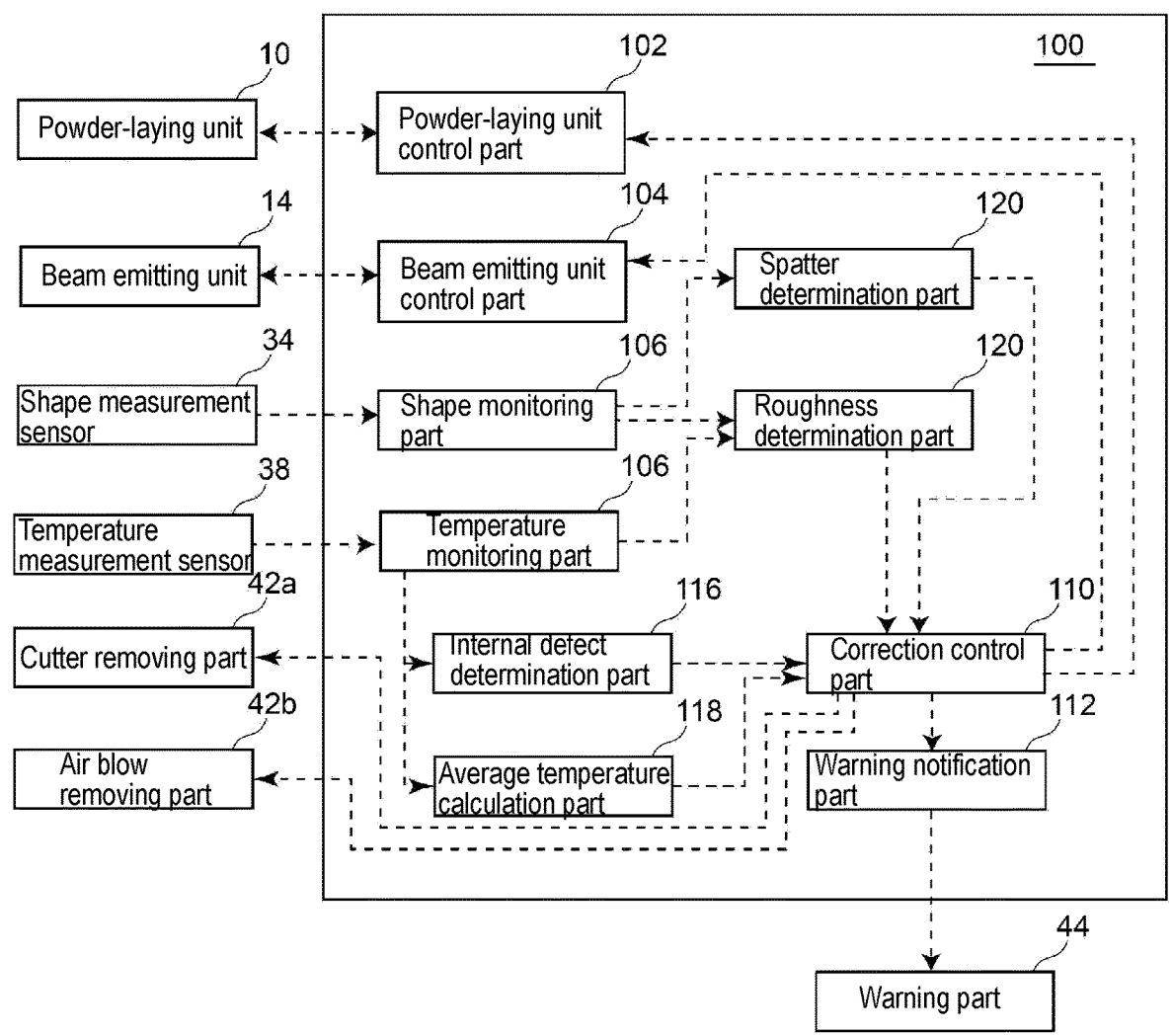
FIG. 17 is a block diagram functionally showing the internal configuration of the control device according to the seventh embodiment.
Figure 18:
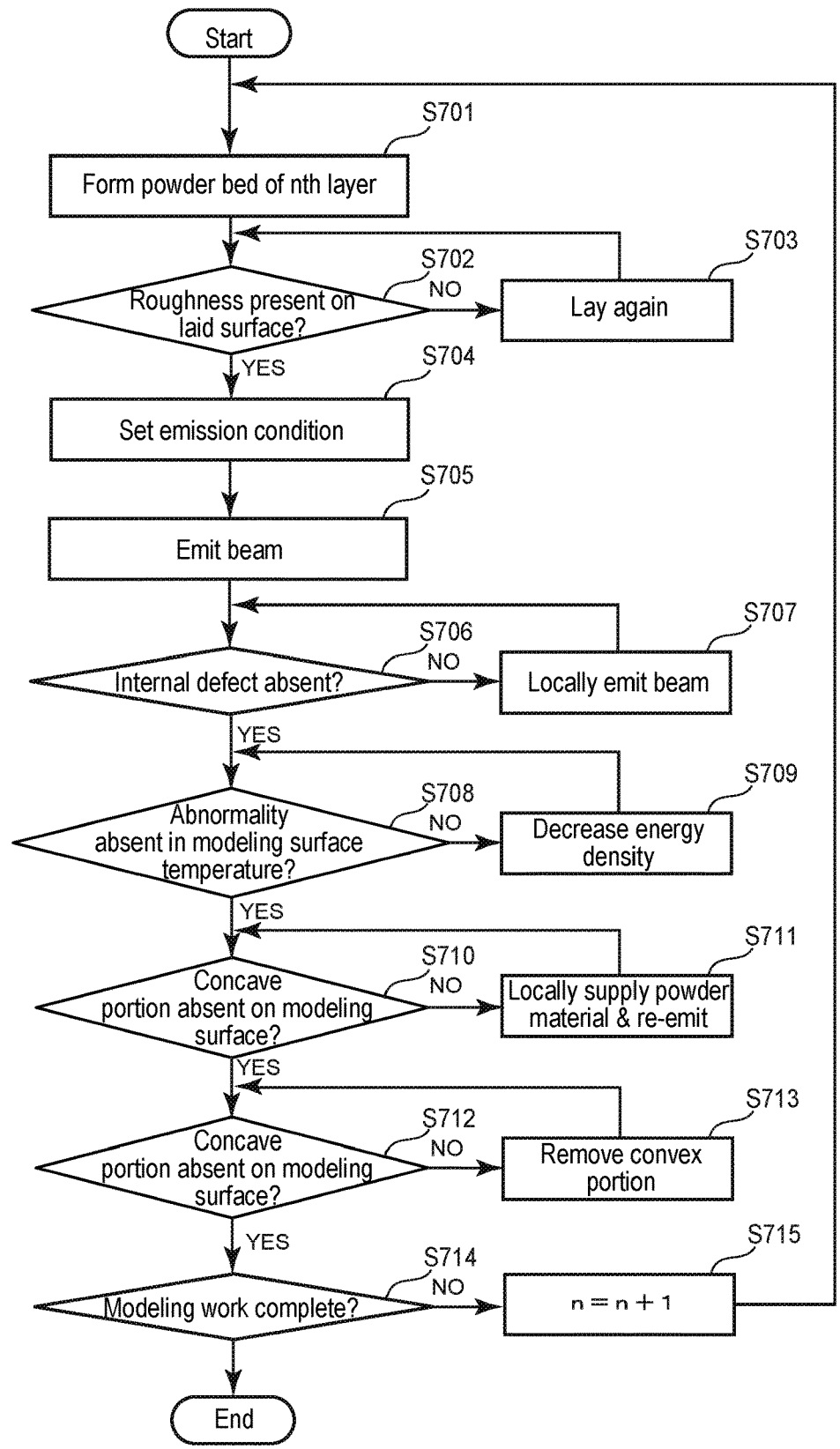
FIG. 18 is a flowchart showing steps of the three-dimensional additive manufacturing method performed by the control device in FIG. 17.

The three-dimensional additive manufacturing device 1 according to the seventh embodiment will be described with reference to FIGS. 17 and 18. FIG. 17 is a block diagram functionally showing the internal configuration of the control device 100 according to the seventh embodiment. FIG. 18 is a flowchart showing steps of the three-dimensional additive manufacturing method performed by the control device 100 in FIG. 17.

In the following description, configurations corresponding to those in the above-described embodiment are associated with the same reference numerals, and not described again unless otherwise required.

As shown in FIG. 17, the control device 100 includes the powder-laying unit control part 102, the beam emitting unit control part 104, the shape monitoring part 106, the temperature monitoring part 114, the internal defect determination part 116, the roughness determination part 108, the average temperature calculation part 118, the spatter determination part 124, the correction control part 110, and the warning notification part 112. The powder-laying unit control part 102 is provided to control the powder-laying unit 10. The beam emitting unit control part 104 is provided to control the beam emitting unit 14. The shape monitoring part 106 measures the shape of the surface of the powder bed 8 or the modeling surface on the basis of the measurement result of the shape measurement sensor 34. The temperature monitoring part 114 measures the temperature of the modeling surface on the basis of measurement results of the temperature measurement sensor (the first temperature measurement sensor 38a and the second temperature measurement sensor 38b). The internal defect determination part 116 determines the presence or absence of an internal defect on the basis of a monitoring result of the temperature monitoring part 114. The roughness determination part 108 determines the presence or absence of the roughness on the surface of the powder bed 8 or the modeling surface on the basis of a monitoring result of the shape monitoring part 106. The average temperature calculation part 118 calculates the average temperature of the powder bed 8 on the basis of the monitoring result of the temperature monitoring part 114. The spatter determination part 124 determines whether the convex portion detected by the roughness determination part 108 is a spatter. The correction control part 110 performs correction control on the basis of a determination result of each part described above. The warning notification part 112 controls the warning part 44.

In the above-described control device 100, the three-dimensional additive manufacturing method according to the seventh embodiment is performed by these constituent elements functioning as follows. In the three-dimensional additive manufacturing method, modeling cycles are repeated in order to form a three-dimensional shaped product to be modeled. However, in the following description, an exemplary description will be given with a focus on the nth (n is an arbitrary natural number) modeling cycle.

First, the powder-laying unit control part 102 controls the powder-laying unit 10 to lay a powder on the base plate 2 or the powder bed 8 of the (n−1)th layer already laid on the base plate, and forms the powder bed 8 of the nth layer (step S701). The newly formed powder bed 8 has the layer thickness to of, for example, several tens μm.

Subsequently, the shape monitoring part 106 measures the surface shape of the powder bed 8 by obtaining the measurement result from the shape measurement sensor 34, and the roughness determination part determines whether there is the roughness on the powder bed 8 on the basis of the measurement result (step S702). If there is the roughness on the powder bed 8 (step S702: NO), the correction control part 110 lays again a powder so as to reduce the roughness on the powder bed 8 before emitting the beam to the powder bed 8 (step S703). Consequently, the roughness on the powder bed 8 is dissolved, making it possible to effectively reduce anomalous occurrence generated by the roughness when the modeling work advances. Moreover, if the roughness is not dissolved even by the re-laying work, the correction control part 110 may command the warning notification part 112 to output a warning from the warning part 44.

Since details of respective steps in steps S702 to S704 are as described in the first embodiment above, the detailed description thereof will be omitted here.

Subsequently, the beam emitting unit control part 104 controls the beam emitting unit 14 to set emission conditions corresponding to the three-dimensional shaped product to be modeled for the formed powder bed 8 of the nth layer (step S704) and perform modeling by emitting a beam on the basis of the set emission conditions (step S705).

While the beam is scanned/emitted in step S705, the temperature monitoring part 114 obtains the measurement results from the first temperature measurement sensor 38a and the second temperature measurement sensor 38b, and the internal defect determination part 116 determines the presence or absence of the internal defect on the basis of the measurement results (step S706). If there is the internal defect (step S706: NO), the correction control part 110 causes the beam emitting unit control part 104 to control the beam emitting unit 14 to emit again a beam to the position which is determined as having the internal defect (step S707). Consequently, the position having the internal defect is melted again, eliminating the internal defect.

Since details of respective steps in steps S706 and S707 are as described in the second embodiment above, the detailed description thereof will be omitted here.

Subsequently, the average temperature calculation part 118 calculates the average temperature on the basis of the measurement results of the first temperature measurement sensor 38a and the second temperature measurement sensor 38b, and determines whether there is an abnormality in the average temperature (step S708). The determination determines that there is the abnormality if, in particular, the difference $\Delta T$ from the average temperature in the previous modeling cycle is not less than the reference value Tref as described in the third embodiment above. If there is the abnormality in the average temperature (step S708: NO), the correction control part 110 performs correction control on the beam emitting unit control part 104 to decrease an energy density of the beam emitted by the beam emitting unit 14 (step S709). Consequently, the emission conditions set in step S704 are changed so as to decrease the emission density. It is possible to suppress the quality variations in the stacking height direction by thus performing control to decrease the beam emission density if it is determined that accumulation of the thermal quantity on the modeling surface increases since the difference $\Delta T$ is larger than the reference value $\Delta$Tref.

Since details of respective steps in steps S708 and S709 are as described in the third embodiment above, the detailed description thereof will be omitted here.

Subsequently, the shape monitoring part 106 obtains the measurement result from the shape measurement sensor 34, and the roughness determination part 108 determines whether there is the roughness on the modeling surface on the basis of a result obtained by the shape monitoring part 106 (steps S710, S712). If there is the concave portion on the modeling surface (step S710: NO), the correction control part 110 controls the powder-supplying unit 12 to selectively (locally) supply the powder to the concave portion detected by the shape measurement sensor 34 and controls the beam emitting unit control part 104 to emit the beam to the supplied powder (step S711). Consequently, the concave portion existing on the modeling surface is filled with the powder and hardened by beam emission. Since the concave portion existing on the modeling surface is thus dissolved in the middle of the modeling work, it is possible to prevent, at an early stage, the concave portion from becoming an abnormality as the modeling work advances.

Since details of respective steps in steps S710 and S711 are as described in the fourth embodiment above, the detailed description thereof will be omitted here.

On the other hand, if there is the convex portion on the modeling surface (step S712: NO), the correction control part 110 performs at least one of i) re-emission of a beam to the convex portion, ii) mechanical removal of the convex portion by using at least one of the cutter removing part and the air blow removing part, and iii) selective (local) re-emission of a beam to the convex portion by the beam emitting unit 14 (step S713). Since the convex portion existing on the modeling surface is thus dissolved in the middle of the modeling work, it is possible to prevent, at an early stage, the convex portion from becoming an abnormality as the modeling work advances.

Since i) is as described in the fifth embodiment above, and ii) and iii) are as described in the sixth embodiment above, the detailed description thereof will be omitted here.

Subsequently, the control device 100 determines whether a series of modeling works completes the process by sufficiently repeating the modeling cycle (step S714). If the modeling process is not complete (step S714: NO), the control device 100 returns the process to step S701 to shift to the modeling process for the (n+1)th layer (step S715).

After that, if the modeling work is complete by sufficiently repeating the modeling cycle (step S714: YES), the non-destructive testing is performed as needed on the completed three-dimensional shaped product, and the series of modeling works is terminated (ended).

As described above, according to the seventh embodiment, it is possible to prevent, in real time, occurrence of the modeling abnormality from different perspectives in the respective steps during the modeling work by combining the respective methods described in the first to the sixth embodiments above. As a result, it is possible to ensure better quality and to achieve higher production efficiency than ever before.

INDUSTRIAL APPLICABILITY

At least one embodiment of the present invention is applicable to the three-dimensional additive manufacturing device manufacturing the three-dimensional shaped product by performing additive manufacturing by emitting a beam to a laid powder and the three-dimensional additive manufacturing method performed by the three-dimensional additive manufacturing device.

REFERENCE SIGNS LIST

1 Three-dimensional additive manufacturing device
10 Powder-laying unit
12 Powder-supplying unit
14 Beam emitting unit
34 Shape measurement sensor
38*a* First temperature measurement sensor
38*b* Second temperature measurement sensor
42 Convex-portion removing unit
42*a* Cutter removing part
42*b* Air blow removing part
44 Warning part
100 Control device
102 Powder-laying unit control part
104 Beam emitting unit control part
106 Shape monitoring part
108 Roughness determination part
110 Correction control part
112 Warning notification part
114 Temperature monitoring part
116 Internal defect determination part
118 Average temperature calculation part
120 Concave-portion determination part
122 Convex-portion determination part
124 Spatter determination part

The invention claimed is:

1. A three-dimensional additive manufacturing device, comprising:
    a base plate;
    a powder-laying unit for laying a powder onto the base plate to form a powder bed;
    a beam emitting unit for emitting a beam to the powder bed so as to harden the powder bed selectively; and
    at least one sensor for measuring a roughness on the powder bed or a roughness on a modeling surface formed by emitting the beam to the powder bed,
    wherein:
    the at least one sensor comprises a shape measurement sensor for measuring the roughness on the powder bed; and
    the powder-laying unit is configured to lay the powder again so as to reduce the roughness on the powder bed before hardening of the powder bed, if a magnitude of the roughness measured by the shape measurement sensor is out of an allowable range.

2. The three-dimensional additive manufacturing device according to claim 1,
    wherein the three-dimensional additive manufacturing device is configured to correct a defect in laying of the powder already performed by the powder-laying unit or a defect in emission of the beam already performed by the beam emitting unit, based on a measurement result of the at least one sensor, before completion of forming of a next layer.

3. The three-dimensional additive manufacturing device according to claim 1, further comprising a component-replacement warning part configured to output a warning to urge replacement of a component of the powder-laying unit, if the magnitude of the roughness measured by the shape measurement sensor is out of the allowable range after the powder is laid again by the powder-laying unit.

4. The three-dimensional additive manufacturing device according to claim 1, wherein:
    the shape measurement sensor is a first shape measurement sensor;
    the at least one sensor comprises a second shape measurement sensor for measuring the roughness on the modeling surface;
    the three-dimensional additive manufacturing device further comprises a powder-supplying unit for supplying the powder selectively to a concave portion measured by the second shape measurement sensor; and
    the beam emitting unit is configured to emit the beam to the powder supplied to the concave portion by the powder-supplying unit.

5. The three-dimensional additive manufacturing device according to claim 1, wherein:
    the shape measurement sensor is a first shape measurement sensor;
    the at least one sensor comprises a second shape measurement sensor for measuring the roughness on the modeling surface; and
    the beam emitting unit is configured to emit the beam to a convex portion measured by the second shape measurement sensor.

6. The three-dimensional additive manufacturing device according to claim 1, wherein:
    the shape measurement sensor is a first shape measurement sensor;
    the at least one sensor comprises a second shape measurement sensor for measuring the roughness on the modeling surface; and
    the three-dimensional additive manufacturing device further comprises a convex-portion removing unit for removing a convex portion measured by the second shape measurement sensor.

7. The three-dimensional additive manufacturing device according to claim 6, wherein the convex-portion removing unit includes a cutter or an air blow torch for removing the convex portion.

8. The three-dimensional additive manufacturing device according to claim 6, further comprising a controller for controlling at least the beam emitting unit and the convex-portion removing unit,
wherein the controller is configured to:
determine whether the convex portion is a spatter formed during emission of the beam, based on a shape of the convex portion measured by the second shape measurement sensor;
control the convex-portion removing unit to remove the spatter if the convex portion is the spatter; and
control the beam emitting unit to emit the beam to the convex portion if the convex portion is not the spatter.

9. The three-dimensional additive manufacturing device according to claim 8, wherein the controller is configured to determine that the convex portion is the spatter, if a projected area of the convex portion is not more than 300 μm×300 μm.

10. A three-dimensional additive manufacturing device, comprising:
a base plate;
a powder-laying unit for laying a powder onto the base plate to form a powder bed;
a beam emitting unit for emitting a beam to the powder bed so as to harden the powder bed selectively;
at least one sensor for measuring a temperature on a modeling surface formed by emitting the beam to the powder bed or a temperature of the powder bed during emission of the beam;
an internal defect determination part for determining presence or absence of an internal defect based on a measurement result of the at least one sensor; and
a correction control part for performing correction control, before hardening of the powder bed, based on a determination result of the internal defect determination part.

11. The three-dimensional additive manufacturing device according to claim 10,
wherein the correction control part is configured to perform, as the correction control, re-emission of the beam to a position determined as having the internal defect.

12. The three-dimensional additive manufacturing device according to claim 10,
wherein the internal defect determination part is configured to calculate a change amount of a local temperature at an in-plane position based on the measurement result of the at least one sensor, specify a position where the change amount is not less than a predetermined threshold as a candidate position where the internal defect exists, and determine that the internal defect exists at a position where a cooling rate at the candidate position is lower than a predetermined threshold.

13. The three-dimensional additive manufacturing device according to claim 10, further comprising an average temperature calculation part configured to calculate an average temperature of the powder bed based on the measurement result of the at least one sensor, wherein the correction control part is configured to perform the correction control based on a calculation result of the average temperature calculation part.

14. A three-dimensional additive manufacturing method which performs modeling by emitting a beam, using a beam emitting unit, to a powder bed formed by laying a powder on a base plate, using a powder-laying unit, to selectively harden the powder bed, the three-dimensional additive manufacturing method comprising:
a measuring step of measuring, using at least one sensor, a roughness on the powder bed or a roughness on a modeling surface formed by emitting the beam to the powder bed; and
a correcting step of correcting a defect in laying of the powder in the powder bed already formed or a defect in emission of the beam already performed by the beam emitting unit, based on a measurement result in the measuring step, before completion of forming of a next layer,
wherein the correcting step includes laying the powder again so as to reduce the roughness on the powder bed before hardening of the powder bed, if the powder-laying unit judges that a magnitude of the roughness measured in the measuring step is out of an allowable range.

15. The three-dimensional additive manufacturing method according to claim 14, wherein:
the measuring step includes measuring the roughness on the modeling surface; and
the correcting step includes supplying the powder selectively to a concave portion measured in the measuring step, and emitting the beam to the powder supplied to the concave portion.

16. The three-dimensional additive manufacturing method according to claim 14, wherein:
the measuring step includes measuring the roughness on the modeling surface; and
the correcting step includes emitting the beam to a convex portion measured in the measuring step.

17. The three-dimensional additive manufacturing method according to claim 14, wherein:
the measuring step includes measuring the roughness on the modeling surface; and
the correcting step includes removing a convex portion measured in the measuring step.

18. The three-dimensional additive manufacturing method according to claim 17,
wherein the correcting step includes removing the convex portion by using a cutter or an air blow torch.

19. The three-dimensional additive manufacturing method according to claim 17,
wherein the correcting step includes:
determining whether the convex portion is a spatter formed during emission of the beam, based on a shape of the convex portion measured in the measuring step;
removing the spatter if the convex portion is the spatter; and
emitting the beam to the convex portion if the convex portion is not the spatter.

* * * * *